US011861867B2

(12) United States Patent
Friedman et al.

(10) Patent No.: US 11,861,867 B2
(45) Date of Patent: Jan. 2, 2024

(54) SYSTEMS, DEVICES AND METHODS FOR MEASURING THE MASS OF OBJECTS IN A VEHICLE

(71) Applicant: Gentex Corporation

(72) Inventors: Yaniv Friedman, Tel-Aviv-Yafo (IL); Guy Trugman, Rishon Letsiyon (IL); Noam Nisenholz, Jerusalem (IL)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 17/625,572

(22) PCT Filed: Jul. 9, 2020

(86) PCT No.: PCT/IL2020/050767
§ 371 (c)(1),
(2) Date: Jan. 7, 2022

(87) PCT Pub. No.: WO2021/005603
PCT Pub. Date: Jan. 14, 2021

(65) Prior Publication Data
US 2022/0292705 A1 Sep. 15, 2022

Related U.S. Application Data

(60) Provisional application No. 62/871,787, filed on Jul. 9, 2019.

(51) Int. Cl.
*G06T 7/73* (2017.01)
*B60R 21/015* (2006.01)
(Continued)

(52) U.S. Cl.
CPC .......... *G06T 7/75* (2017.01); *B60R 21/01512* (2014.10); *G01S 7/4915* (2013.01);
(Continued)

(58) Field of Classification Search
CPC .. G06T 7/75; G06T 7/521; G06T 7/60; G06T 2200/04; G06T 2207/10021;
(Continued)

(56) References Cited

U.S. PATENT DOCUMENTS 8,014,565 B2 * 9/2011 Gordon ................ G06V 40/166
348/169
8,059,867 B2 * 11/2011 Aoki ........................ B60R 1/00
382/104

(Continued)

FOREIGN PATENT DOCUMENTS

WO  WO-2019012534 A1 * 1/2019 ............. G01B 11/25

OTHER PUBLICATIONS

Trivedi et al., "Occupant Posture Analysis with Stereo and Thermal Infrared Video: Algorithms and Experimental Evaluation," IEEE Transactions on Vehicular Technology, vol. 53, No. 6, Nov. 2004, Retrieved from the Internet on Feb. 23, 2022, at URL: https://escholarship.org/content/qt8hf2c8v7/qt8hf2c8v7.pdf.
(Continued)

*Primary Examiner* — Kathleen Y Dulaney
(74) *Attorney, Agent, or Firm* — Price Heneveld LLP; Brian James Brewer

(57) ABSTRACT

There are provided methods and systems for estimating the mass of one or more occupants in a vehicle cabin comprising obtaining multiple images of the one or more occupants, comprising a sequence of 2D (two dimensional) images and 3D (three dimensional) images of the vehicle cabin captured by an image sensor, applying a pose detection algorithm on each of the obtained sequences of 2D images to yield one or more skeleton representations of said one or more occupants and combining the one or more 3D images of said sequence of 3D images with said one or more skeleton representations of said one or more occupants to yield skeleton models and
(Continued)

analyze the skeleton models to extract one or more features of each of the one or more occupants and further process the one or more extracted features of the skeleton models to estimate the mass of the one or more occupants.

19 Claims, 18 Drawing Sheets

(51) Int. Cl.
| | |
|---|---|
| *G06T 7/521* | (2017.01) |
| *H04N 13/254* | (2018.01) |
| *H04N 13/25* | (2018.01) |
| *G01S 17/894* | (2020.01) |
| *G06V 20/59* | (2022.01) |
| *G06V 40/10* | (2022.01) |
| *G01S 7/4915* | (2020.01) |
| *G06T 7/60* | (2017.01) |
| *G06V 10/80* | (2022.01) |
| *G06V 10/82* | (2022.01) |
| *G06V 20/64* | (2022.01) |

(52) U.S. Cl.
CPC ............ *G01S 17/894* (2020.01); *G06T 7/521* (2017.01); *G06T 7/60* (2013.01); *G06V 10/80* (2022.01); *G06V 10/82* (2022.01); *G06V 20/59* (2022.01); *G06V 20/593* (2022.01); *G06V 20/647* (2022.01); *G06V 40/103* (2022.01); *H04N 13/25* (2018.05); *H04N 13/254* (2018.05); *G06T 2200/04* (2013.01); *G06T 2207/10021* (2013.01); *G06T 2207/10028* (2013.01); *G06T 2207/20212* (2013.01); *G06T 2207/30268* (2013.01)

(58) Field of Classification Search
CPC . G06T 2207/10028; G06T 2207/20212; G06T 2207/30268; B60R 21/01512; G01S 7/4915; G01S 17/894; G06V 10/80; G06V 10/82; G06V 20/59; G06V 20/593; G06V 20/647; G06V 40/103; H04N 13/25; H04N 13/254
USPC .................. 382/103, 104, 154, 259; 280/35; 701/45; 340/576
See application file for complete search history.

(56) References Cited

U.S. PATENT DOCUMENTS

| | | | |
|---|---|---|---|
| 8,437,506 B2* | 5/2013 | Williams | A63F 13/213 348/46 |
| 10,321,728 B1* | 6/2019 | Koh | G06T 7/11 |
| 2003/0234519 A1* | 12/2003 | Farmer | G06V 10/771 280/728.1 |
| 2006/0186651 A1* | 8/2006 | Aoki | B60R 1/00 280/735 |
| 2006/0229784 A1* | 10/2006 | Bachmann | B60R 21/01512 701/45 |
| 2009/0129630 A1 | 5/2009 | Gloudemans et al. | |
| 2009/0252423 A1 | 10/2009 | Zhu et al. | |
| 2010/0274449 A1* | 10/2010 | Yonak | B60R 21/0134 701/45 |
| 2011/0317871 A1* | 12/2011 | Tossell | G06V 40/23 382/103 |
| 2013/0250050 A1* | 9/2013 | Kanaujia | H04N 13/106 348/42 |
| 2014/0097957 A1* | 4/2014 | Breed | G08B 21/06 340/576 |
| 2014/0098093 A2 | 4/2014 | Haker et al. | |
| 2014/0219550 A1 | 8/2014 | Popa et al. | |
| 2015/0146923 A1 | 5/2015 | Lee et al. | |
| 2016/0071322 A1* | 3/2016 | Nishiyama | G06T 19/00 345/632 |
| 2017/0344829 A1* | 11/2017 | Lan | G06V 40/103 |
| 2018/0272977 A1* | 9/2018 | Szawarski | B60R 21/01512 |
| 2019/0359169 A1* | 11/2019 | Schutera | B60R 21/015 |
| 2020/0074227 A1* | 3/2020 | Lan | G06F 18/214 |
| 2022/0067410 A1* | 3/2022 | Raz | H04N 13/254 |

OTHER PUBLICATIONS

Holte et al., "Human 3D Pose Estimation and Activity Recognition from Multi-View Videos: Comparative Explorations of Recent Developments," IEEE Journal of Selected Topics in Signal Processing, Special Issue on Emerging Techniques in 3D, 2011, Retrieved from the Internet on Feb. 23, 2022, at URL: http://citeseerx.ist.psu.edu/viewdoc/download?doi=10.1.1.359.6149&rep=rep1&type=pdf.

* cited by examiner

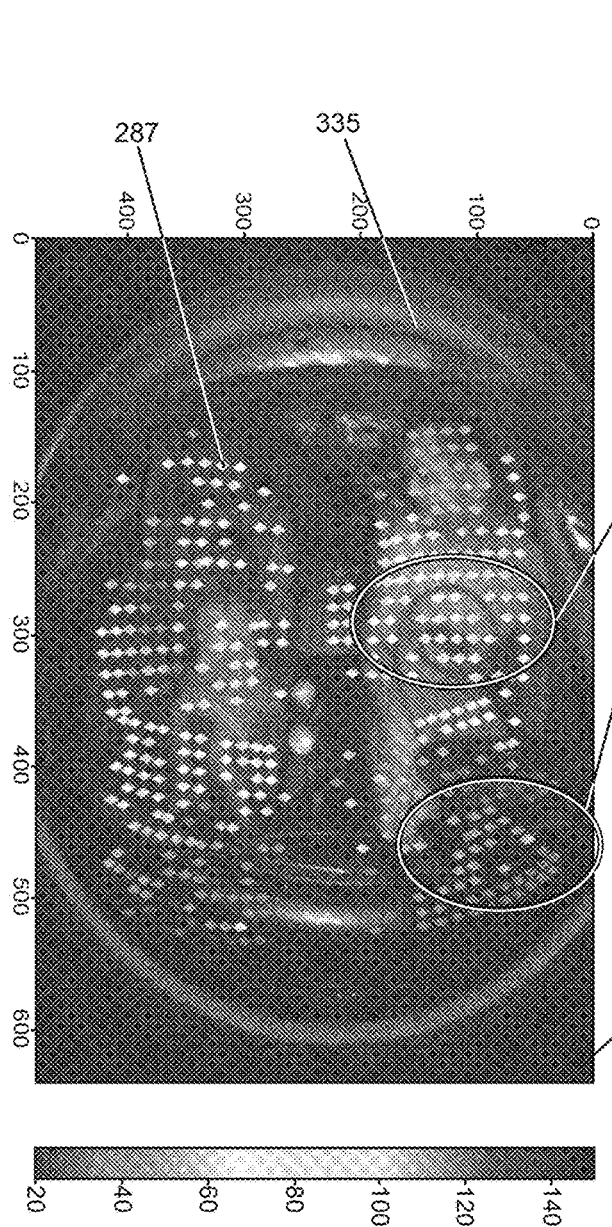
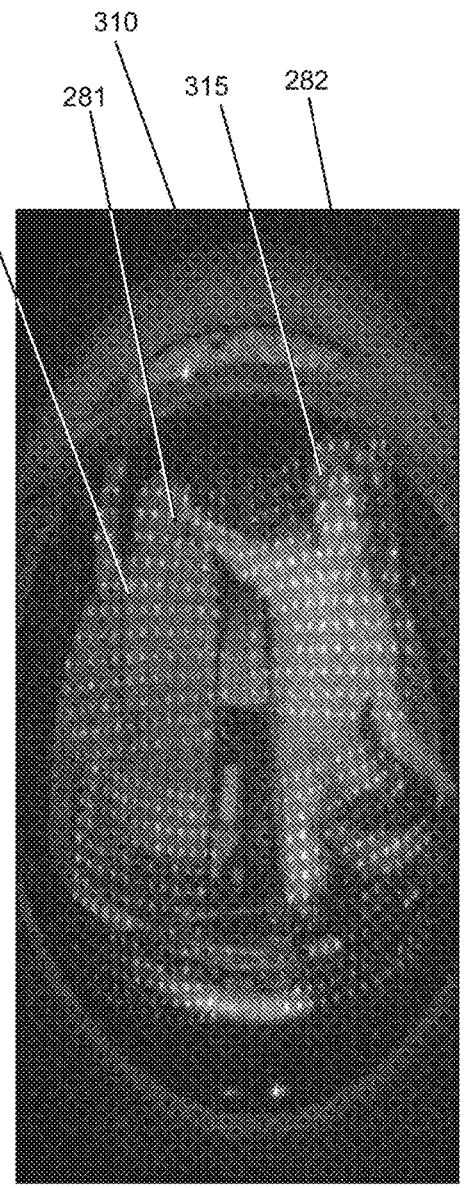
FIGURE 3A
FIGURE 3B

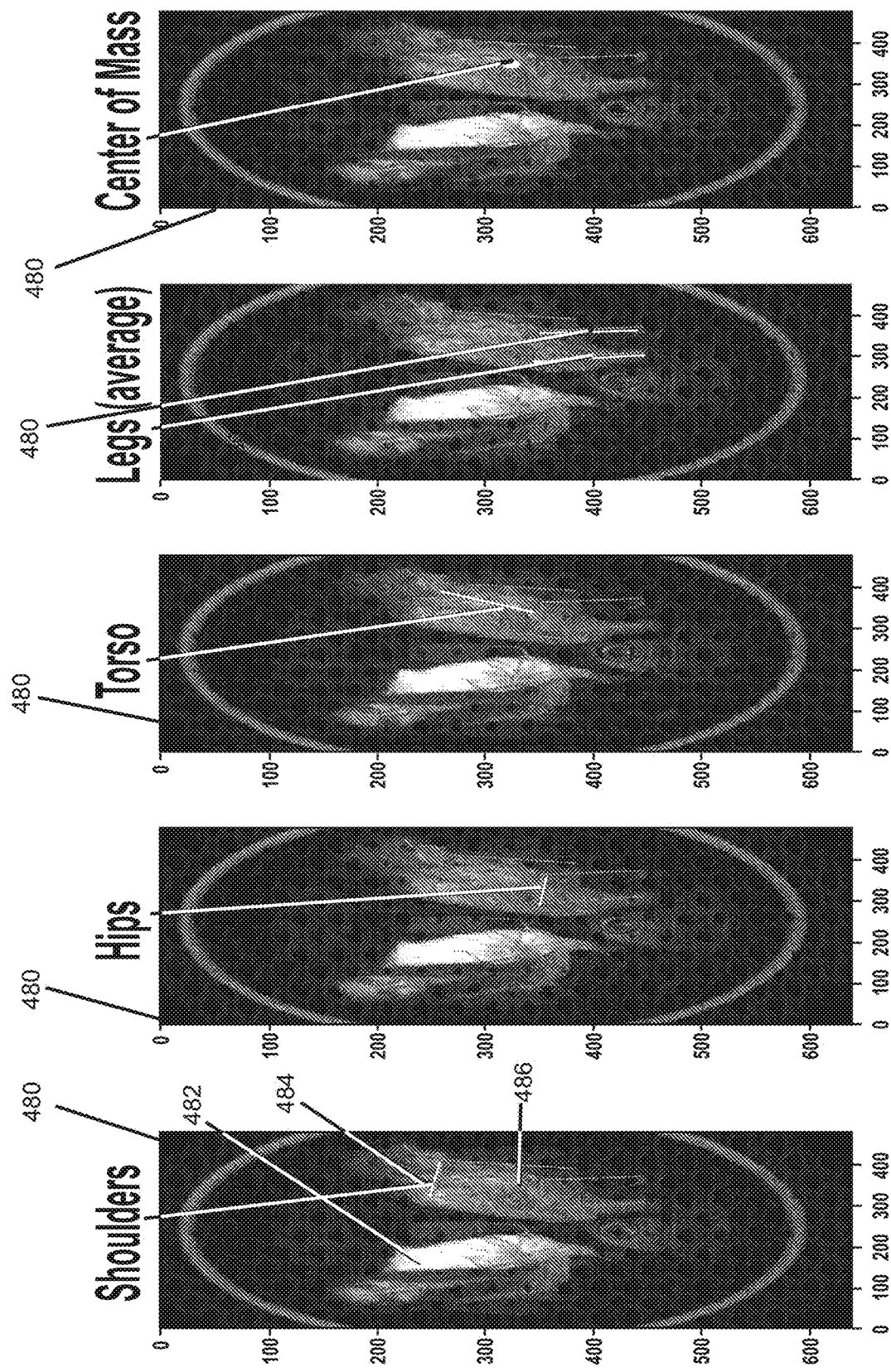

700

```
┌─────────────────────────────────────────────────────────────────┐
│ Obtain multiple images comprising a sequence of 2D and 3D images│
│          comprising one or more occupants of the vehicle cabin  │
│                              710                                │
└─────────────────────────────────────────────────────────────────┘
                                 ↓
┌─────────────────────────────────────────────────────────────────┐
│ Apply a pose detection algorithm on each of the obtained sequence of 2D │
│ images to yield a 2D skeleton representation of said one or more occupants; │
│                              720                                │
└─────────────────────────────────────────────────────────────────┘
                                 ↓
┌─────────────────────────────────────────────────────────────────┐
│ Analyze the obtained sequence of 3D images to generate a depth map │
│         representation of the one or more occupants             │
│                              730                                │
└─────────────────────────────────────────────────────────────────┘
                                 ↓
┌─────────────────────────────────────────────────────────────────┐
│ Combine the depth maps of each 3D image of said sequence of 3D images │
│ with the 2D skeleton representation of said one or more occupants to yield at │
│    least one 3D skeleton model for each one of the one or more occupants │
│                              740                                │
└─────────────────────────────────────────────────────────────────┘
                                 ↓
┌─────────────────────────────────────────────────────────────────┐
│ Analyze each 3D skeleton model to extract at least one feature of each of the │
│                    one or more occupants                        │
│                              750                                │
└─────────────────────────────────────────────────────────────────┘
                                 ↓
┌─────────────────────────────────────────────────────────────────┐
│ Analyze the 3D skeleton models to filter out one or more 3D skeleton models │
│              and yield valid 3D skeleton models                 │
│                              760                                │
└─────────────────────────────────────────────────────────────────┘
                                 ↓
┌─────────────────────────────────────────────────────────────────┐
│ Analyze the valid 3D skeleton models to determine the mass of the one or more │
│                            occupants.                           │
│                              770                                │
└─────────────────────────────────────────────────────────────────┘
```

FIGURE 7A

```
                    ┌─────────────────────────────────────────────────────────────┐
    705             │ Obtain multiple images comprising a sequence of 2D and 3D   │
                    │ images of one or more occupants of the vehicle cabin        │
                    │                          710                                │
                    └─────────────────────────────────────────────────────────────┘
                                                │
                                                ▼
                    ┌─────────────────────────────────────────────────────────────┐
                    │ Apply a pose detection algorithm on each of the obtained    │
                    │ sequence of 2D images to yield a 2D skeleton representation │
                    │ of said one or more occupants;                              │
                    │                          720                                │
                    └─────────────────────────────────────────────────────────────┘
                                                │
                                                ▼
                    ┌─────────────────────────────────────────────────────────────┐
                    │ Analyze the obtained sequence of 3D images to generate a    │
                    │ depth map representation of the one or more occupants       │
                    │                          730                                │
                    └─────────────────────────────────────────────────────────────┘
                                                │
                                                ▼
                    ┌─────────────────────────────────────────────────────────────┐
                    │ Combine the depth maps of each 3D image of said sequence    │
                    │ of 3D images with the 2D skeleton representation of said    │
                    │ one or more occupants to yield at least one 3D skeleton     │
                    │ model for each one of the one or more occupants             │
                    │                          740                                │
                    └─────────────────────────────────────────────────────────────┘
                                                │
                                                ▼
                    ┌─────────────────────────────────────────────────────────────┐
                    │ Analyze each 3D skeleton model to extract at least one      │
                    │ feature of each of the one or more occupants                │
                    │                          750                                │
                    └─────────────────────────────────────────────────────────────┘
                                                │
                                                ▼
                    ┌─────────────────────────────────────────────────────────────┐
                    │ Analyze the 3D skeleton models to filter out one or more    │
                    │ 3D skeleton models and yield valid 3D skeleton models       │
                    │                          760                                │
                    └─────────────────────────────────────────────────────────────┘
                                                │
                                                ▼
                    ┌─────────────────────────────────────────────────────────────┐
                    │ Analyze the valid 3D skeleton models to determine the mass  │
                    │ of the one or more occupants.                               │
                    │                          770                                │
                    └─────────────────────────────────────────────────────────────┘
                                                │
                                                ▼
                    ┌─────────────────────────────────────────────────────────────┐
                    │ Classify mass of the identified occupants in accordance     │
                    │ with one or more measured weight sub-categories             │
                    │                          781                                │
                    └─────────────────────────────────────────────────────────────┘
                                                │
                                                ▼
                    ┌─────────────────────────────────────────────────────────────┐
                    │ Output one or more signals to activate one or more units in │
                    │ the vehicle based on the mass classification                │
                    │                          782                                │
                    └─────────────────────────────────────────────────────────────┘
```

FIGURE 7C

SYSTEMS, DEVICES AND METHODS FOR MEASURING THE MASS OF OBJECTS IN A VEHICLE

CROSS-REFERENCE

This is a National Stage Application under 35 U.S.C. § 371 of International Application No. PCT/IL2020/050767, filed on Jul. 9, 2020, entitled "SYSTEMS, DEVICES AND METHODS FOR MEASURING THE MASS OF OBJECTS IN A VEHICLE," which claims the benefit of U.S. Provisional Application Ser. No. 62/871,787, filed on Jul. 9, 2019, entitled "SYSTEMS, DEVICES AND METHODS FOR MEASURING THE MASS OF OBJECTS IN A VEHICLE," the entire disclosures of which are incorporated herein by reference.

TECHNICAL FIELD

The present invention, in some embodiments thereof, relates to estimating the mass of one or more objects, and more specifically, but not exclusively, to measure and determine the mass of occupying objects in a vehicle and controlling the vehicle's systems such as the vehicle's airbag system based on the measured mass of the occupying objects.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BACKGROUND OF THE INVENTION

Automobiles equipped with airbag systems are well known in the prior art. Consequently, the introduction of airbag systems into automobiles has significantly improved the safety of the automobile's occupants. In such airbag systems, the car crash is sensed and the airbags rapidly inflated thereby ensuring the safety of an occupation in a car crash. Many lives have now been saved by such airbag systems. Unfortunately, airbags can also cause fatal injuries if the occupant mass and size are small, for example, in cases where the occupants are children. In response to this, the National Highway Transportation and Safety Administration (NHTSA) has mandated that starting in the 2006 model year all automobiles be equipped with an automatic suppression system to detect the presence of a child or infant and suppress the airbag.

As a result, today airbag and seatbelt technologies are being developed to tailor airbag deployment according to the severity of the crash, the size and posture of the vehicle occupant, belt usage, and how close the driver or passenger(s) are to the airbag(s). For example, adaptive airbag systems utilize multi-stage airbags to adjust the pressure within the airbag. The greater the pressure within the airbag, the more force the airbag will exert on the occupants as they come in contact with it. These adjustments allow the system to deploy the airbag with a moderate force for most collisions and reserving the maximum force airbag only for the severest of collisions. An airbag control unit (ACU) is in communication with one or more sensors of the vehicle to determine the location, mass or relative size of the occupants. Information regarding the occupants and the severity of the crash are used by the ACU, to determine whether airbags should be suppressed or deployed, and if so, at various output levels. For example, based on the received measured mass of the occupant (e.g. high, mid, low) the ACU may accordingly operate the airbag.

Prior mass estimation technologies used for updating the ACU include utilizing mechanical solutions such as pressure pads or optical sensors embedded within the vehicle seats. For example, U.S. Pat. No. 5,988,676 entitled "Optical weight sensor for vehicular safety restraint systems" disclose an optical weight sensor which is configured to determine the weight of an occupant sitting on a vehicle seat and is mounted between the seat frame and mounting structure of the vehicle seat. The prior mass estimation systems and airbags technologies can be less than ideal in at least some respects. Prior weight estimation systems are inaccurate providing sometimes wrong mass estimations for example as a result of vehicle acceleration. Additionally, prior solutions technologies can be larger than ideal for use in vehicles. Also, the cost of prior mass estimation technologies can be greater than would be ideal. The prior spectrometers can be somewhat bulky and can require more alignment than would be ideal in at least some instances.

In light of the above, an improved system, device and method for estimating and/or measuring and/or classifying the mass of objects in a vehicle interior would be beneficial. Ideally, such systems would be accurate, compact, integrated with other devices and systems, such as a vehicle's systems and devices, sufficiently rugged and low in cost.

SUMMARY OF THE INVENTION

In accordance with a first embodiment of the present invention there is provided a method for estimating the mass of one or more occupants in a vehicle cabin, the method comprising: providing a processor configured to: obtain multiple images of said one or more occupants, wherein said multiple images comprising a sequence of 2D (two dimensional) images and 3D (three dimensional) images of the vehicle cabin captured by an image sensor; apply a pose detection algorithm on each of the obtained sequences of 2D images to yield one or more skeleton representations of said one or more occupants; combine one or more 3D image of said sequence of 3D images with said one or more skeleton representations of said one or more occupants to yield at least one skeleton model for each one or more occupants wherein said skeleton model comprises information relating to the distance of one or more key-points of the skeleton model from a viewpoint; analyze the one or more skeleton models to extract one or more features of each of the one or more occupants; process the one or more extracted features of the skeleton models to estimate the mass of each said one or more occupants.

In an embodiment, the processor is configured to filter out one or more skeleton models based on predefined filtering criteria to yield valid skeleton models.

In an embodiment, the predefined filtering criteria include specific selection rules which define valid poses or orientations of one or more occupants.

In an embodiment, the predefined filtering criteria is based on measured confidence grades of one or more key-points in said 2D skeleton representations.

In an embodiment, the confidence grades are based on a measured probability heat map of said one or more key-points.

In an embodiment, the predefined filtering criteria is based on a high-density model.

In an embodiment, the processor is configured to generate one or more output signals comprising said estimated mass of each said one or more occupants.

In an embodiment, the output signals are associated with an operation of one or more of the vehicle's units.

In an embodiment, the vehicle's units are selected from the group consisting of: airbag; Electronic Stabilization Control (ESC) Unit; safety belt.

In an embodiment, the sequence of 2D images are visual images of the cabin.

In an embodiment, the sequence of 3D images are one or more of: reflected light pattern images; stereoscopic images.

In an embodiment, the images sensor is selected from a group consisting of: Time of Flight (ToF) camera; stereoscopic camera.

In an embodiment, the pose detection algorithm is configured to identify the pose and orientation of the one or more occupants in the obtained 2D images.

In an embodiment, the pose detection algorithm is configured to: identify in at least one 2D image of said sequence of 2D images multiple key-points of said one or occupant body portions; link pairs of said detected multiple key points to generate the skeleton representation of said occupant in said 2D images.

In an embodiment, the key points are joints of the occupant's body.

In an embodiment, the pose detection algorithm is an OpenPose algorithm.

The method of claim 1 wherein said one or more extracted features are one or more of the occupants: shoulder length; torso length; knees length; pelvis location; hips width.

In accordance with a second embodiment of the present invention there is provided a method for estimating the mass of one or more occupants in a vehicle cabin, the method comprising: providing a processor configured to: obtain multiple images of said one or more occupants, wherein said multiple images comprising a sequence of 2D (two dimensional) images and 3D (three dimensional) images of the vehicle cabin captured by an image sensor; apply a pose detection algorithm on each of the obtained sequences of 2D images to yield one or more skeleton representations of said one or more occupants; analyze the one or more 3D images of the sequence of 3D images to extract one or more depth values of said one or more occupants; apply the extracted depth values accordingly on the skeleton representation to yield scaled skeleton representations of the one or more occupants wherein said scaled skeleton model comprises information relating to the distance of the skeleton model from a viewpoint; analyze the scaled skeleton representations to extract one or more features of each of the one or more occupants; process the one or more extracted features to estimate the mass or body mass classification of each said one or more occupants.

In an embodiment, the processor is configured to filter out one or more skeleton representations based on predefined filtering criteria to yield valid skeleton representations.

In an embodiment, the predefined filtering criteria include specific selection rules which define valid poses or orientations of one or more occupants.

In an embodiment, the predefined filtering criteria is based on measured confidence grades of one or more key-points in said 2D skeleton representations.

In an embodiment, the confidence grades are based on a measured probability heat map of said one or more key-points.

In an embodiment, the predefined filtering criteria is based on a high-density model.

In an embodiment, the processor is configured to generate one or more output signals comprising said estimated mass or body mass classification of each said one or more occupants.

In an embodiment, the output signals correspond to an operation of one or more of the vehicle's units.

In accordance with a third embodiment of the present invention there is provided a system for estimating the mass of one or more occupants in a vehicle cabin, the system comprising: a sensing device comprising: an illumination module comprising one or more illumination sources configured to illuminate said vehicle cabin; at least one imaging sensor configured to capture a sequence of 2D (two dimensional) images and 3D (three dimensional) images of the vehicle cabin; and at least one processor configured to: apply a pose detection algorithm on each of the obtained sequences of 2D images to yield one or more skeleton representations of said one or more occupants; combine one or more 3D image of said sequence of 3D images with said one or more skeleton representations of said one or more occupants to yield at least one skeleton model for each one or more occupants wherein said skeleton model comprises information relating to the distance of one or more key-points in the skeleton model from a viewpoint; analyze the one or more skeleton models to extract one or more features of each of the one or more occupants; process the one or more extracted features of the skeleton models to estimate the mass of each said one or more occupants.

In an embodiment, the processor configured to filter out one or more skeleton models based on predefined filtering criteria to yield valid skeleton models.

In an embodiment, the predefined filtering criteria include specific selection rules which define valid poses or orientations of one or more occupants.

In an embodiment, the predefined filtering criteria is based on measured confidence grades of one or more key-points in said 2D skeleton representations.

In an embodiment, the confidence grades are based on a measured probability heat map of the one or more key-points.

In an embodiment, the predefined filtering criteria is based on a high-density model.

In an embodiment, the sensing device is selected from a group consisting of: ToF sensing device; stereoscopic sensing device.

In an embodiment, the sensing device is a structured light pattern sensing device and the at least one illumination source is configured to project modulated light in a predefined structured light pattern on the vehicle cabin.

In an embodiment, the predefined structured light pattern is constructed of a plurality of diffused light elements.

In an embodiment, the light elements shape is one or more of a: dot; line; stripe; or a combination thereof.

In an embodiment, the processor is configured to generate one or more output signals comprising said estimated mass or body mass classification of each said one or more occupants.

In an embodiment, the output signals correspond to an operation of one or more of the vehicle's units.

In an embodiment, the vehicle's units are selected from the group consisting of:
Airbag; Electronic Stabilization Control (ESC) Unit; safety belt.

In accordance with a third embodiment of the present invention there is provided a non-transitory computer readable storage medium storing computer program instructions, the computer program instructions when executed by a computer processor cause the processor to perform the steps of: obtaining a sequence of 2D (two dimensional) images and 3D (three dimensional) images of the one or more occupants, wherein the 3D images having a plurality of pattern features according to the illumination pattern; applying a pose detection algorithm on each of the obtained sequences of 2D images to yield one or more skeleton representations of said one or more occupants; combining one or more 3D image of said sequence of 3D images with said one or more skeleton representations of said one or more occupants to yield at least one skeleton model for each one or more occupants wherein said skeleton model comprises information relating to the distance of one or more key-points in the skeleton model from a viewpoint; analyzing the one or more skeleton models to extract one or more features of each of the one or more occupants; process the one or more extracted features of the skeleton models to estimate the mass or body mass classification of each said one or more occupants.

BRIEF DESCRIPTION OF THE DRAWINGS

A better understanding of the features and advantages of the present disclosure will be obtained by reference to the following detailed description that sets forth illustrative embodiments, in which the principles of embodiments of the present disclosure are utilized, and the accompanying drawings.

FIGS. 3A and 3B illustrate two images comprising reflected light pattern, in accordance with some embodiments of the present disclosure;

FIGS. 4C-4G show captured image comprising a skeleton of annotations representation, in accordance with some embodiments of the present disclosure;

FIG. 7A is a schematic high-level flowchart of a method for measuring the mass of one or more occupants in a vehicle, in accordance with some embodiments of the present disclosure;

FIG. 7C is a schematic flowchart of a method for determining the mass of one or more occupants in a vehicle, in accordance with other embodiments of the present disclosure;

DETAILED DESCRIPTION OF THE INVENTION

Figure 1A:
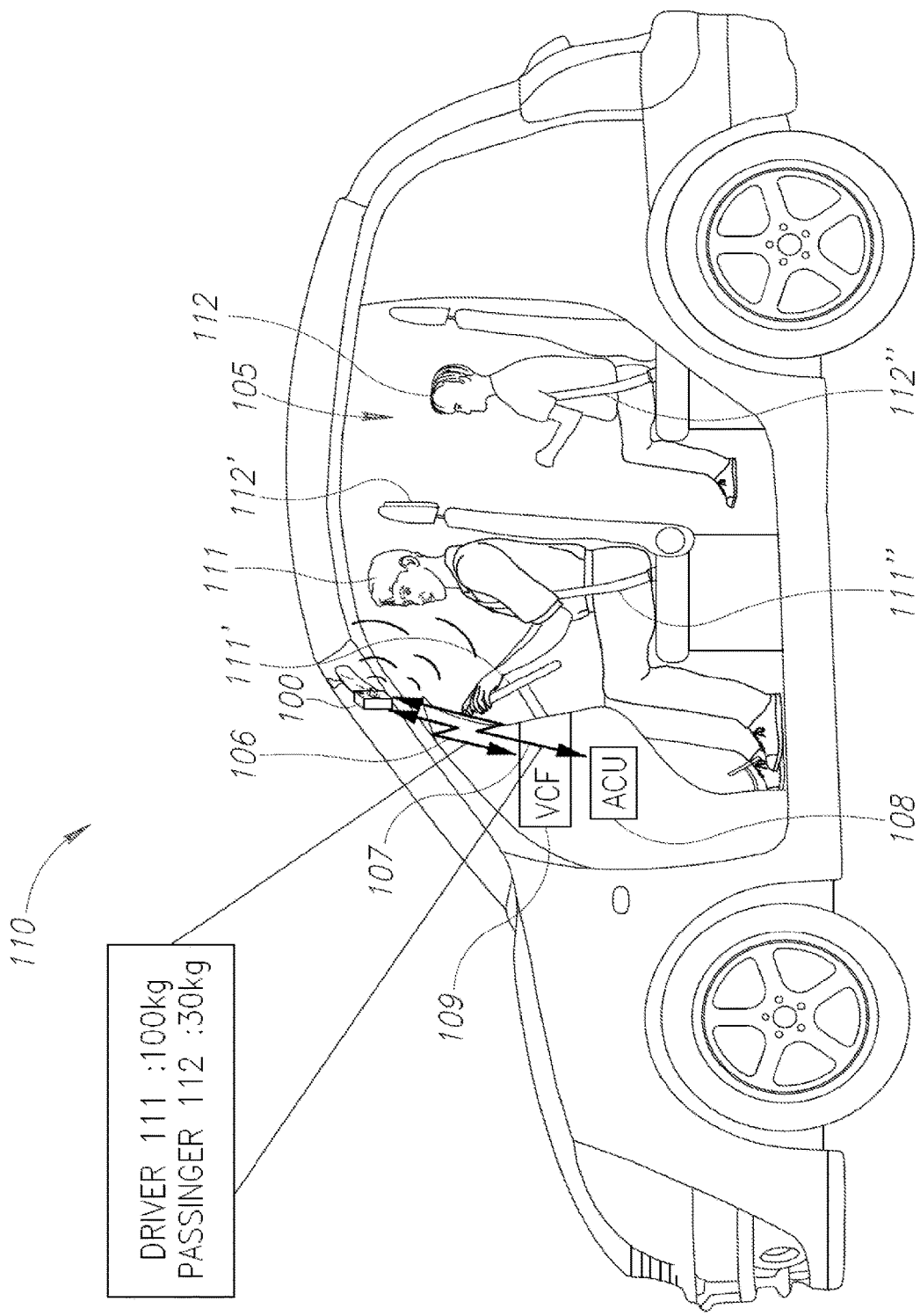
FIGS. 1A and 1B show respectively a side view of a vehicle cabin before and following a car accident, wherein the airbags are activated using a mass estimation system, in accordance with some embodiments of the present disclosure.

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figure and described in the specification, but only as indicated in the accompanying claims, with the proper scope determined only by the broadest interpretation of said claims. The configurations disclosed herein can be combined in one or more of many ways to provide improved mass measuring methods, systems and devices of one or more occupying objects (e.g. driver or passengers) in a vehicle having an interior passenger compartment by analyzing one or more images of the occupying objects. One or more components of the configurations disclosed herein can be combined with each other in many ways.

Systems and methods as described herein including obtaining one or more images of a vehicle interior passenger compartment including one or more objects such as one or more occupants (e.g. vehicle driver or passenger(s)), and at least one processor to extract visual data and depth data from the obtained images, combine the visual and depth data and analyze the combined data to estimate the mass of the one or more objects in the vehicle.

In accordance with other embodiments, systems and methods as described herein including one or more imaging devices and one or more illumination sources can be used to capture one or more images of a vehicle interior passenger compartment including one or more objects such as one or more occupants (e.g. vehicle driver or passenger(s)), and at least one processor to extract visual data and depth data from the captured images, combine the visual and depth data and analyze the combined data to estimate the mass of the one or more objects in the vehicle.

Specifically, in accordance with some embodiments there are provided methods for measuring the mass of one or more occupying objects (e.g. driver or passengers) in a vehicle having an interior passenger compartment, the method comprising using at least one processor to: obtain multiple images of said one or more occupants, wherein said multiple images comprising 2D (two dimensional) images and 3D (three dimensional) images such as a sequence of 2D images and 3D images of the vehicle cabin captured by an image sensor; apply a pose detection algorithm on each of the obtained sequences of 2D images to yield one or more skeleton representations of said one or more occupants; combine one or more 3D image of the sequence of 3D images with said one or more skeleton representations of the one or more occupants to yield at least one skeleton model for each one or more occupants wherein the skeleton model comprises information relating to the distance of one or more key-points of the skeleton model from a viewpoint; analyze the one or more skeleton models to extract one or more features of each of the one or more occupants; process the one or more extracted features of the skeleton models to estimate the mass or body mass classification of each said one or more occupants.

According to some embodiments, the imaging device and the one or more illumination sources may be installed and/or embedded in a vehicle, specifically in a cabin of the vehicle (e.g. in proximity to the vehicle's front mirror or dashboard and/or integrated into the overhead console).

According to another embodiment, there is provided an imaging system comprising one or more illumination sources configured to project one or more light beams in a predefined structured light pattern on vehicle cabin including one or more occupants and an imaging device comprising a sensor configured to capture a plurality of images comprising reflections of the structured light pattern for example from the one or more occupants in the vehicle cabin, and one or more processors configured to: obtain multiple images of said one or more occupants, wherein said multiple images comprising one or more 2D (two dimensional) images and 3D (three dimensional) images such as a sequence of 2D (two dimensional) images and 3D (three dimensional) images of the vehicle cabin captured by an image sensor; apply a pose detection algorithm on each of the obtained sequences of 2D images to yield one or more skeleton representations of said one or more occupants; combine one or more 3D image of said sequence of 3D images with said one or more skeleton representations of said one or more occupants to yield at least one skeleton model for each one or more occupants wherein said skeleton model comprises information relating to the distance of one or more key-points of the skeleton model from a viewpoint; analyze the one or more skeleton models to extract one or more features of each of the one or more occupants; process the one or more extracted features of the skeleton models to estimate the mass or body mass classification of each said one or more occupants.

According to some embodiments, the systems and methods are configured to generate one or more outputs, such as output signals which may be associated with the operation of one or more devices, units, applications or systems of the vehicle based on the measured mass. For example, the output signals may include information configured to optimize the vehicles' units performances once activated. In some cases, the units or systems of the vehicle may include the vehicle's airbag, seats, and/or optimize vehicle's electronic stabilization control (ESC) according to the occupant's distribution and measured mass.

Advantageously, the systems and methods in accordance with embodiments may include a sensing system comprising for example a single imaging device to capture one or more images of the scene and extract visual data, depth data and other data such as speckle pattern(s) from the captured images to detect vibrations (e.g. micro vibrations), for example, in real-time. For example, in accordance with embodiments, the vehicle's occupant's mass classification may be estimated using a stand-alone sensing system comprising, for example, a single imaging device and a single illumination source. In some cases, the imaging system may include more than one imaging device and illumination source. In some cases, two or more imaging devices may be used.

As used herein, like characters refer to like elements.

Prior to the detailed description of the invention being set forth, it may be helpful to set forth definitions of certain terms that will be used hereinafter.

As used herein, the term "mass" encompasses the quantity of matter which a body contains, as measured by its acceleration under a given force or by the force exerted on it by a gravitational field. However, as in common usage, the present invention also refers to measuring the "weight" of an object where "weight" encompasses the force exerted on the mass of a body by a gravitational field.

As used herein, the term "light" encompasses electromagnetic radiation having wavelengths in one or more of the ultraviolet, visible, or infrared portions of the electromagnetic spectrum.

The term "structured light" as used herein is defined as the process of projecting a known pattern of pixels on to a scene. The way that these deform when striking surfaces allows vision systems to extract the depth and surface information of the objects in the scene.

The terms "pattern" and "pattern feature(s)" as used in this application refer to the structured illumination discussed below. The term "pattern" is used to denote the forms and shapes produced by any non-uniform illumination, particularly structured illumination employed a plurality of pattern features, such as lines, stripes, dots, geometric shapes, etc., having uniform or differing characteristics such as shape, size, intensity, etc. As a non-limiting example, a structured light illumination pattern may comprise multiple parallel lines as pattern features. In some cases, the pattern is known and calibrated.

The term "modulated structured light pattern" as used herein is defined as the process of projecting a modulated light in a known pattern of pixels on to a scene.

The term "depth map" as used herein is defined as an image that contains information relating to the distance of the surfaces of scene objects from a viewpoint. A depth map may be in the form of a mesh connecting all dots with z-axis data.

The term "object" or "occupying object" or "occupant" as used herein is defined as any target of sensing, including any number of particular elements and/or background, and including scenes with particular elements. The disclosed systems and methods may be applied to the whole target of imaging as the object and/or to specific elements as objects within an imaged scene. Nonlimiting examples of an "object" may include one or more persons such as vehicle passengers or driver.

Referring now to the drawings, FIG. 1A is a side view of a vehicle 110 showing a passenger cabin 105 comprising the vehicle 110 units and a sensing system 100 configured and enabled to obtain visual (e.g. video images) and stereoscopic data (e.g. depth maps), for example 2D (two dimensional)

images and 3D (three dimensional) images of areas and objects within the vehicle and analyze, for example in real-time or close to real-time, the visual and stereoscopic data to yield the mass (e.g. body mass classification) of the objects (e.g. occupants) in the vehicle, in accordance with embodiments.

Specifically, the sensing system 100 is configured to monitor areas and objects within the vehicle 110 to obtain video images and depth maps of the areas and objects, and analyze the obtained video images and depth maps using one or more processors to estimate the mass of the objects. Nonlimiting examples of such objects may be one or more of the vehicle's occupants such as driver 111 or passenger(s) 112, in accordance with embodiments.

According to some embodiments the sensing system 100 may be installed, mounted, integrated and/or embedded in the vehicle 110, specifically in a cabin of the vehicle such that the cabin interior and the object(s) present in the cabin may include, for example, the one or more a vehicle occupant (e.g. a driver, a passenger, a pet, etc.), one or more objects associated with the cabin (e.g. door, window, headrest, armrest, etc.), and/or the like.

Figure 1B:
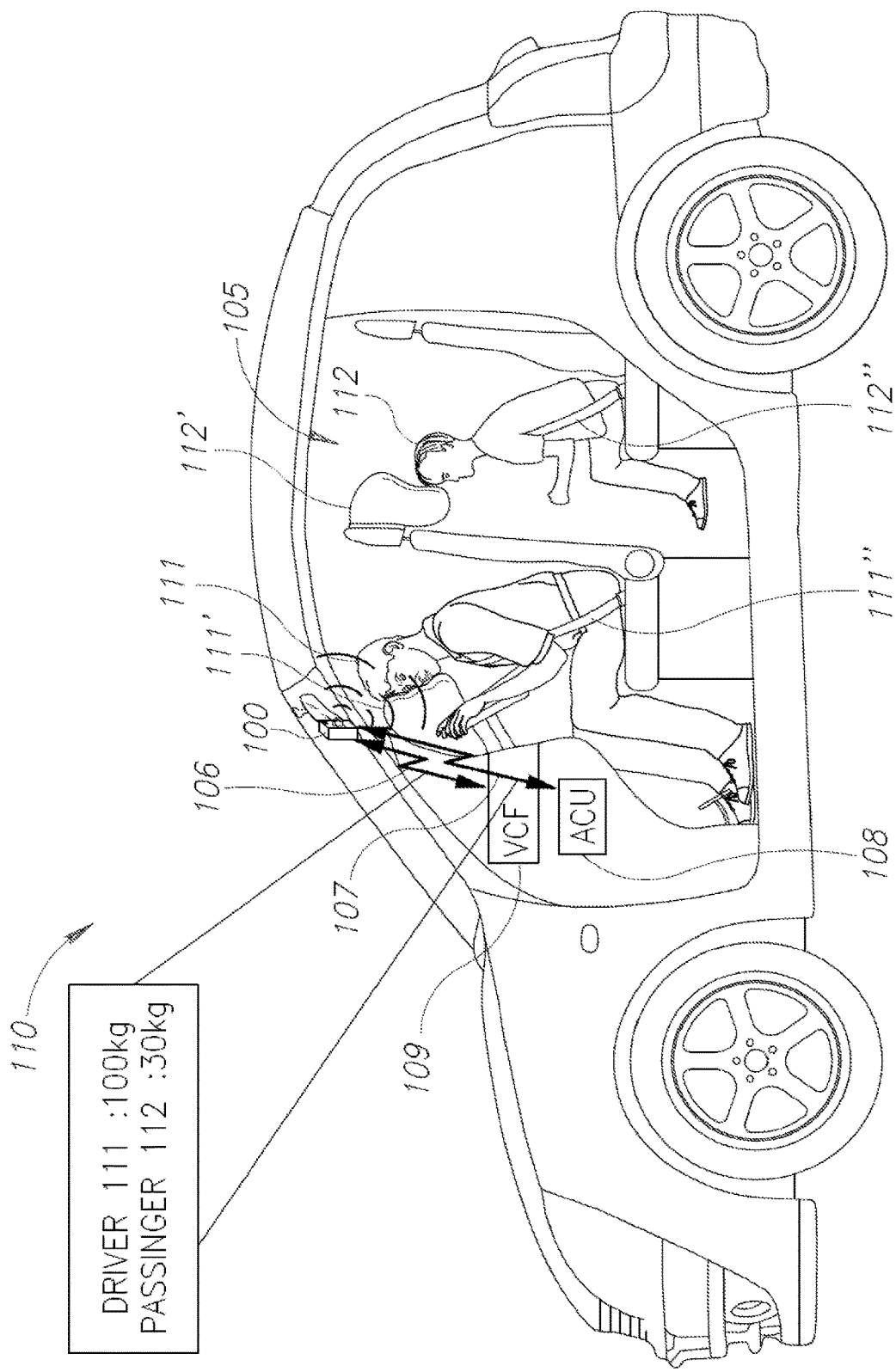

According to some embodiments, the systems and methods are configured to generate an output, such as one or more output signals 106 and 107 which may be associated with an operation of one or more of the vehicle's units to control one or more devices, applications or systems of the vehicle 110 based on the measured objects mass. For example, the output signals 106 and 107 which include the estimated mass of one or more occupants, such as driver 111 and passenger 112, as measured by the sensing system 110, may be transmitted to an ACU 108 and/or to Vehicle Computing System (VCS) 109 which are configured to activate, in case of an accident, one or more airbag systems such variable intensity airbag system 111' of driver 111 and variable intensity airbag system 112' of passenger 112. In accordance with embodiments, the variable intensity airbags 111' and 112' may have different activation levels (e.g. strong/med/weak) and the pressure within the variable intensity airbags are accordingly activated to match the estimated mass classification of the vehicle occupants. In other words, the signal may be sent to the ACU 108 or VCS 109 which activates one or more airbags according to the measured category of each occupant. Specifically, adaptive airbag systems may utilize multi-stage airbags to adjust the pressure within the airbag according to the received mass estimation. The greater the pressure within the airbag, the more force the airbag will exert on the occupants as they come in contact with it. For example, as illustrated in FIG. 1B, in a scenario where driver 111 weights around 100 kg and passenger 112 (child) weights less than 30 kg, upon collision the airbag of each passenger and driver is deployed, in real-time according to the passenger estimated mass, e.g. forcefully (high pressure) for the '100 kg' weight driver 111 and less forcefully (mid or low pressure) to the 30 kg passenger. Alternatively or in combination, the output including the mass estimation result for each occupant may be transmitted to control the vehicle's seatbelt pre-tension. For example, upon collision seat belts (e.g. seat belts 111" and 112") are applied with pre-tension according to the mass estimation such that the passengers are optimally protected.

In other embodiments, the output comprising the mass estimation data may be used to optimize a vehicle's electronic stabilization control (ESC) according to occupant's distribution in the vehicle; and/or activate deactivate any of the vehicle's units which the mass estimation may be related therein.

According to some embodiments, the system 100 may include one or more sensors, for example of different types, such as a 2D imaging device and/or a 3D imaging device and/or an RF imaging device and/or a vibration sensor (micro-vibration) and the like to capture sensory data of the vehicle cabin. Specifically, the 2D imaging device may capture images of the vehicle cabin, for example from different angels, and generate original visual images of the cabin. In an embodiment, the system 100 may include an imaging device configured to capture 2D and 3D images of the vehicle cabin and at least one processor to analyze the images to generate a depth map of the cabin. In another embodiment, the system 100 may detect vibrations (e.g. micro vibrations) of one or more objects in the cabin using one or more vibration sensor and/or analyzing the captured 2D or 3D images to identify vibrations (e.g. micro vibrations) of the objects.

According to another embodiment, the system 100 may further include a face detector sensor and/or face detection and/or face recognition software module for analyzing the captured 2D and/or 3D images.

In an embodiment, the system 100 may include or may be in communication with a computing unit comprising one or more processors configured to receive the sensory data captured by the system's 100 image sensors and analyze the data according to one or more of computer vision and/or machine learning algorithms to estimate the mass of one or more occupants in the vehicle cabin as will be illustrated herein below.

Specifically, in accordance with embodiments, the one or more processors are configured to combine 2D data (e.g. captured 2D images) and 3D data (depth maps) of the vehicle cabin to yield mass classification of one or more objects in the vehicle cabin, for example, the vehicle occupants.

Advantageously, system 100 provides merely the minimal hardware such as one or more sensors and imagers for capturing visual and depth images of the vehicle 110 interior. In some cases, an interface connecting to system 100 may supply the necessary power and transfer the data acquired to the vehicle's computing and/or processing units such as VCS 109 and/or ACU 108, where all the processing is being carried out, taking advantage of its computing power. Thus, in accordance with some embodiments, installing system 100 becomes very easy and using off-the-shelf components.

Figure 1C:
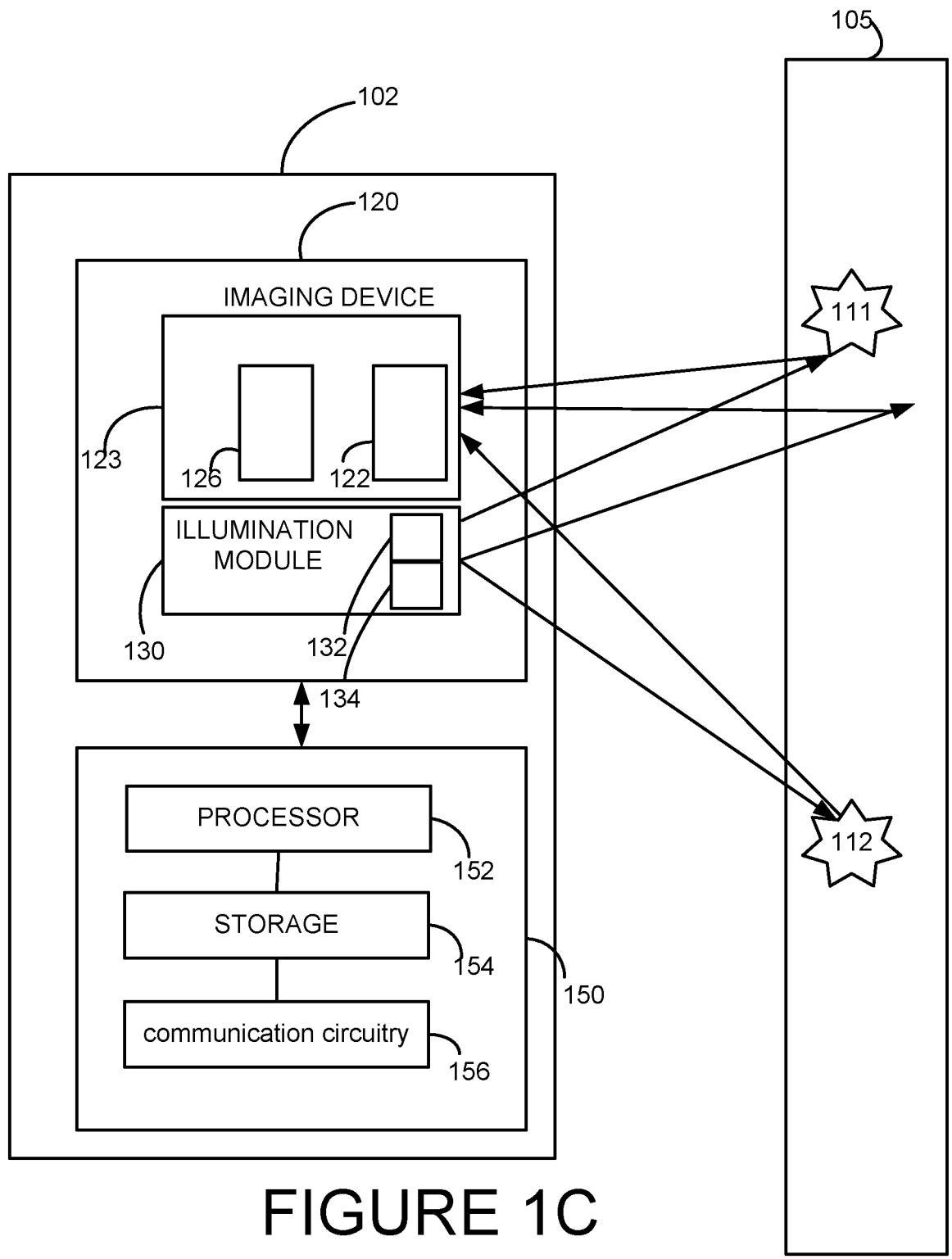
FIG. 1C shows a schematic diagram of an imaging system configured and enabled to capture images of a scene, in accordance with some embodiments of the present disclosure.

FIG. 1C shows a schematic diagram of a sensing system 102, configured and enabled to capture images of a scene, for example a vehicle cabin, including one or more objects (e.g. driver 111 and/or passenger 112) and analyze the captured images to estimate the mass of the one or more objects, in accordance with embodiments. In some cases, the sensing system 102 may be the system 100 of FIGS. 1A and 1B. System 102 includes an imaging device 120, configured and enabled to capture sensory data of one or more objects, such as objects 111 and 112 in scene 105, and a control unit 150 configured to analyze the captured sensory data to determine the mass of the one or more objects, in accordance with embodiments.

Optionally the imaging device 120 and the control unit 150 are integrated together in a single device. In some cases, the imaging device 120 and the control unit 150 are integrated separately in different devices.

According to one embodiment, the imaging device 120 may be a ToF (Time-of-Flight) imaging device including one or more ToF sensors such as Continuous Wave Modulation (CWM) sensors or other types of ToF sensors for obtaining 3D data of the scene and one or more sensors for obtaining 2D of the scene.

According to one embodiment, the imaging device 120 may be a stereoscopic imaging device including one or more stereoscopic imagers for obtaining 3D data of the scene and one or more imagers for obtaining 2D of the scene.

Figure 1D:
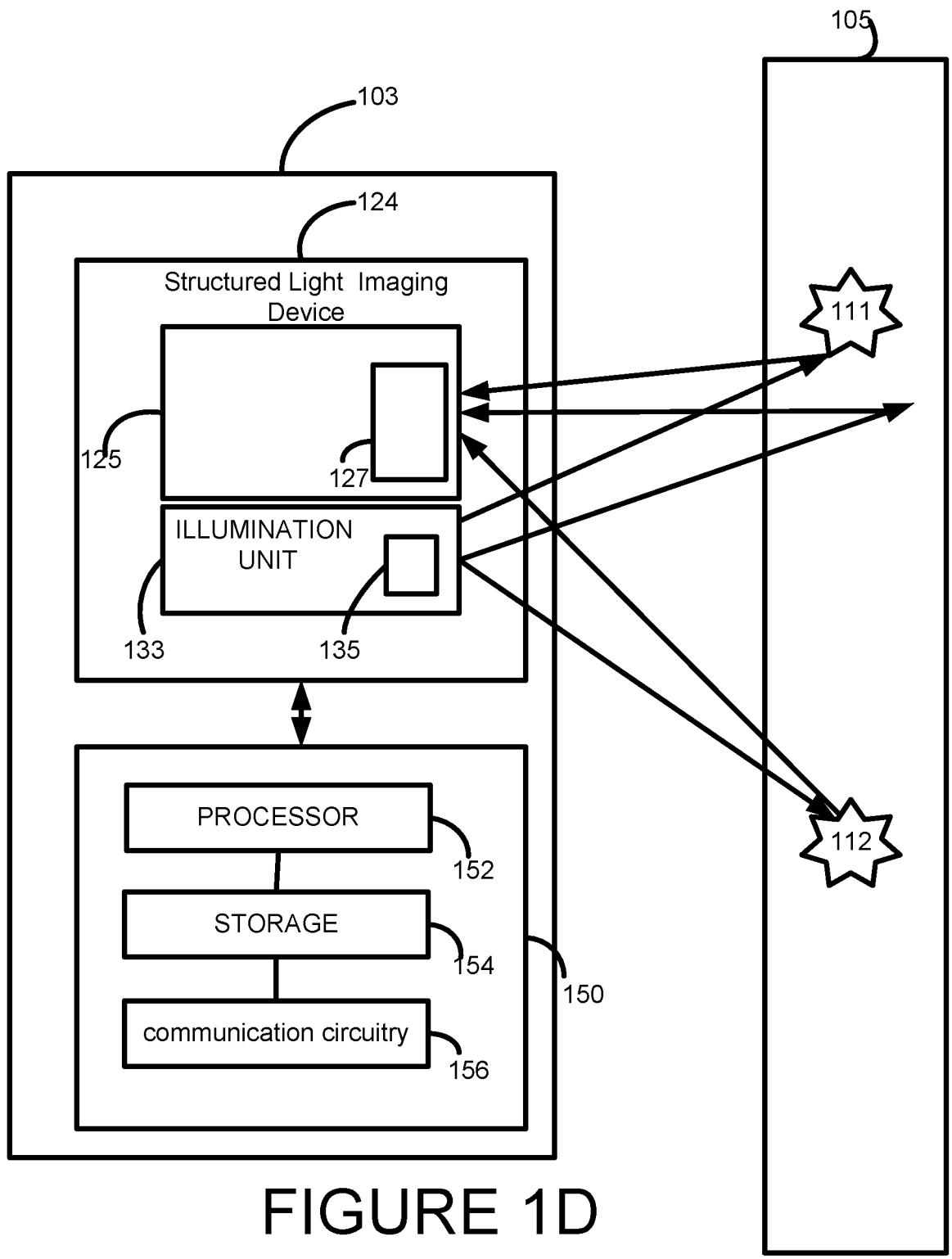
FIG. 1D shows a schematic diagram of a sensing system configured and enabled to capture reflected structured light images of a vehicle cabin including one or more objects and analyze the captured images to estimate the mass of the one or more objects, in accordance with some embodiments of the present disclosure.

According to one embodiment, the imaging device 120 may be a structured light imaging device including one or more imagers for obtaining 3D data of the scene and one or more imagers for obtaining 2D of the scene, as illustrated herein below in FIG. 1D.

Specifically, in an embodiment, imaging device 120 comprises an illumination module 130 configured to illuminate scene 105, and an imaging module 123 configured to capture 2D and/or 3D images of the scene. In some cases, imaging module 123 comprises one or more imagers such as cameras or video cameras of different types, such as cameras 126 and 122. For example, camera 126 may capture 3D images or 3D video images of the scene (e.g. for measuring the depth of the scene and the depth of objects in the scene) while camera 122 may capture 2D images (e.g. original visual images) of the scene. For example, camera 126 may be a stereoscopic camera with two or more lenses having, for example, a separate image sensor for each lens and camera 122 may be a 2D camera. Alternatively or in combination, camera 126 may be a 3D camera adapted to capture reflections of the diffused light elements of the structured light pattern reflected from objects present in the scene. In some cases, the imaging module 123 may include a single camera configured to capture 2D and 3D images of the scene.

The illumination module 130 is configured to illuminate the scene 105, using one or more illumination sources such as illumination sources 132 and 134. In some embodiments, the illumination module 130 is configured to illuminate the scene with broad-beamed light such as high-intensity flood light to allow good visibility of the scene (e.g. vehicle interior) and accordingly for capturing standard images of the scene. In some embodiments, the illumination module is configured to illuminate alternately the scene with structured light and non-structured light (e.g. floodlight) and accordingly capture 2D images and 3D images of the scene. For example, the imaging module 123 may capture one or more 2D images in floodlight and continuously capturing 3D images in structured light to yield alternate depth frames and video frames of the vehicle interior. For example, the illumination source 132 may be a broad-beamed illumination source and illumination source 134 may be a structured light source. In some cases, the 2D and 3D images are captured by a single imager. In some cases, the 2D and 3D images are captured by multiple synchronized images. It is understood that embodiments of the present invention may use any other kind of illumination sources and imagers to obtain visual (e.g. 2D images) and depth maps (e.g. 3D images) of the vehicle interior.

In some embodiments, the 2D and 3D images are correctly aligned (e.g. synched) to each other so each point (e.g. pixel) in one can be found respectively in the other. This can either happen automatically from the way the structure is built, or require an additional alignment step between the two different modalities.

According to one embodiment, the structured light pattern may be constructed of a plurality of diffused light elements, for example, a dot, a line, a shape and/or a combination thereof. According to some embodiments, the one or more light sources such as light source 134, may be a laser and/or the like configured to emit coherent or incoherent light such that the structured light pattern is a coherent or incoherent structured light pattern.

According to some embodiments, the illumination module 130 is configured to illuminate selected parts of the scene.

In an embodiment, the light source 134 may include one or more optical elements for generating a pattern such as a pattern of spots that for example uniformly cover the field of view. This can be achieved by using one or more beam splitters including optical elements such as a diffractive optical element (DOE), split mirrors, one or more diffusers or any type of beam splitter configured to split the single laser spot to multiple spots. Other patterns such as a dot, a line, a shape and/or a combination thereof may be projected on the scene. In some cases, the illumination unit doesn't include a DOE.

According to some embodiments, imager 126 may be a CMOS or CCD sensors. For example, the sensor may include a two-dimensional array of photo-sensitive or photo-responsive elements, for instance a two-dimensional array of photodiodes or a two-dimensional array of charge coupled devices (CODs), wherein each pixel of the imager 126 measures the time the light has taken to travel from the illumination module 130 (to the object and back to the focal plane array).

In some cases, the imaging module 123 may further include one or more optical band-pass filter, for example for passing only the light with the same wavelength as the illumination unit.

The imaging device 120 may optionally include a buffer communicatively coupled to the imager 126 to receive image data measured, captured or otherwise sensed or acquired by the imager 126. The buffer may temporarily store image data until the image data is processed.

In accordance with embodiments, the imaging device 120 is configured to estimate sensory data including for example visual images (e.g. 2D images) and depth parameters of the scene, e.g., the distance of the detected objects to the imaging device. The measured sensory data is analyzed for example by the one or more processors such as the processor 152 to extract 3D data including the distance of the detected objects to the imaging device (e.g. depth maps) based on the obtained 3D data and the pose/orientation of the detected objects from the visual images and combine both types of data to determine the mass of the objects in the scene 105 as will be described in further detail herein.

The control board 150 may comprise one or more of processors 152, memory 154 and communication circuitry 156. Components of the control board 150 can be configured to transmit, store, and/or analyze the captured sensory data. Specifically, one or more processors are configured to analyze the captured sensory data to extract visual data and depth data FIG. 1D shows a schematic diagram of a sensing system 103, configured and enabled to capture reflected structured light images of a vehicle cabin including one or more objects (e.g. driver 111 and/or passenger 112) and analyze the captured images to estimate the mass of the one or more objects, in accordance with embodiments. In some cases, the sensing system 103 may be the system 100 of FIGS. 1A and 1B. System 103 includes a structured light imaging device 124, configured and enabled to capture sensory data of one or more objects, such as objects 111 and 112 in scene 105, and a control unit 150 configured to analyze the captured sensory data to determine the mass of the one or more objects, in accordance with embodiments.

Optionally the imaging device 124 and the control unit 150 are integrated together in a single device. In some cases, the imaging device 120 and the control unit 150 are integrated separately in different devices.

In an embodiment, the structured light imaging device 124 comprises a structured light illumination module 133 configured to project a structured light pattern (e.g. modulated structure light) on scene 105, for example in one or more light spectrums, and an imaging sensor 125 (e.g. a camera, an infrared camera and/or the like) to capture images of the scene. The imaging sensor 125 is adapted to capture reflections of the diffused light elements of the structured light pattern reflected from objects present in the scene. As such, the imaging sensor 125 may be adapted to operate in the light spectrum(s) applied by the illumination module 133 in order to capture the reflected structured light pattern.

In accordance with embodiments, the imaging sensor 125 may include an imager 127 comprising one or more lens for gathering the reflected light and images from the scene onto the imager 127.

In accordance with embodiments, the imaging sensor 125 can capture visual images of the scene (e.g. 2D images) and images comprising the reflected light pattern which can be processed by one or more processors to extract 3D images for further measuring the depth of the scene and objects in the scene by quantifying the changes that an emitted light signal encounters when it bounces back from the one or more objects in the scene and use the reflected light pattern characteristics in at least one pixel of the sensor to identify the distance of the objects and/or the scene from the imaging device.

In an embodiment, the depth data and the visual data (e.g. 2D images) derived from the analyses of images captured by the imaging sensor 125 are time synchronized. In other words, as the mass classification is derived from analysis of common images captured by the same imaging sensor (of the imaging system) they may also be inherently time (temporally) synchronized thus further simplifying correlation of the derived data with the object(s) in the scene.

The illumination module 133 is configured to project a structured light pattern on scene 105, for example in one or more light spectrums such as near-infrared light emitted by an illumination source 135. The structured light pattern may be constructed of a plurality of diffused light elements. According to some embodiments, the illumination module 133 may comprise one or more light sources such as a single coherent or incoherent light source 135, for example, a laser and/or the like configured to emit coherent light such that the structured light pattern is a coherent structured light pattern.

According to some embodiments, the illumination module 133 is configured to illuminate selected parts of the scene.

In an embodiment, the illumination module 133 may include one or more optical elements for generating a pattern such as a pattern of spots that for example uniformly cover the field of view. This can be achieved by using one or more beam splitters including optical elements such as a diffractive optical element (DOE), split mirrors, one or more diffusers or any type of beam splitter configured to split the single laser spot to multiple spots. Other patterns such as a dot, a line, a shape and/or a combination thereof may be projected on the scene. In some cases, the illumination unit doesn't include a DOE.

In particular, the illumination source 135 may be controlled to produce or emit light such as modulated light in a number of spatial or two-dimensional patterns. Illumination may take the form of any of a large variety of wavelengths or ranges of wavelengths of electromagnetic energy. For instance, illumination may include electromagnetic energy of wavelengths in an optical range or portion of the electromagnetic spectrum including wavelengths in a human-visible range or portion (e.g., approximately 390 nm-750 nm) and/or wavelengths in the near-infrared (NIR) (e.g., approximately 750 nm-1400 nm) or infrared (e.g., approximately 750 nm-1 mm) portions and/or the near-ultraviolet (NUV) (e.g., approximately 400 nm-300 nm) or ultraviolet (e.g., approximately 400 nm-122 nm) portions of the electromagnetic spectrum. The particular wavelengths are exemplary and not meant to be limiting. Other wavelengths of electromagnetic energy may be employed. In some cases, the illumination source 135 wavelengths may be any one of the ranges of 830 nm or 840 nm or 850 nm or 940 nm.

According to some embodiments, the imager 127 may be a CMOS or CCD sensors. For example, the sensor may include a two-dimensional array of photo-sensitive or photo-responsive elements, for instance a two-dimensional array of photodiodes or a two-dimensional array of charge coupled devices (CODs), wherein each pixel of the imager 127 measures the time the light has taken to travel from the illumination source 135 (to the object and back to the focal plane array).

In some cases, the imaging sensor 125 may further include one or more optical band-pass filter, for example for passing only the light with the same wavelength as the illumination module 133.

The imaging device 124 may optionally include a buffer communicatively coupled to the imager 127 to receive image data measured, captured or otherwise sensed or acquired by the imager 127. The buffer may temporarily store image data until the image data is processed.

In accordance with embodiments, the imaging device 124 is configured to estimate sensory data including for example visual images and depth parameters of the scene, e.g., the distance of the detected objects to the imaging device. The measured sensory data is analyzed for example by the one or more processors such as the processor 152 to extract 3D data including the distance of the detected objects to the imaging device (e.g. depth maps) from the pattern images and the pose/orientation of the detected objects from the visual images and combine both types of data to determine the mass of the objects in the scene 105 as will be described in further detail herein.

The control board 150 may comprise one or more of processors 152, memory 154 and communication circuitry 156. Components of the control board 150 can be configured to transmit, store, and/or analyze the captured sensory data. Specifically, one or more processors such as processors 152 are configured to analyze the captured sensory data to extract visual data and depth data.

Optionally the imaging device 124 and the control unit 150 are integrated together in a single device or system such as system 100. In some cases, the imaging device 124 and the control unit 150 are integrated separately in different devices.

Figure 2A:
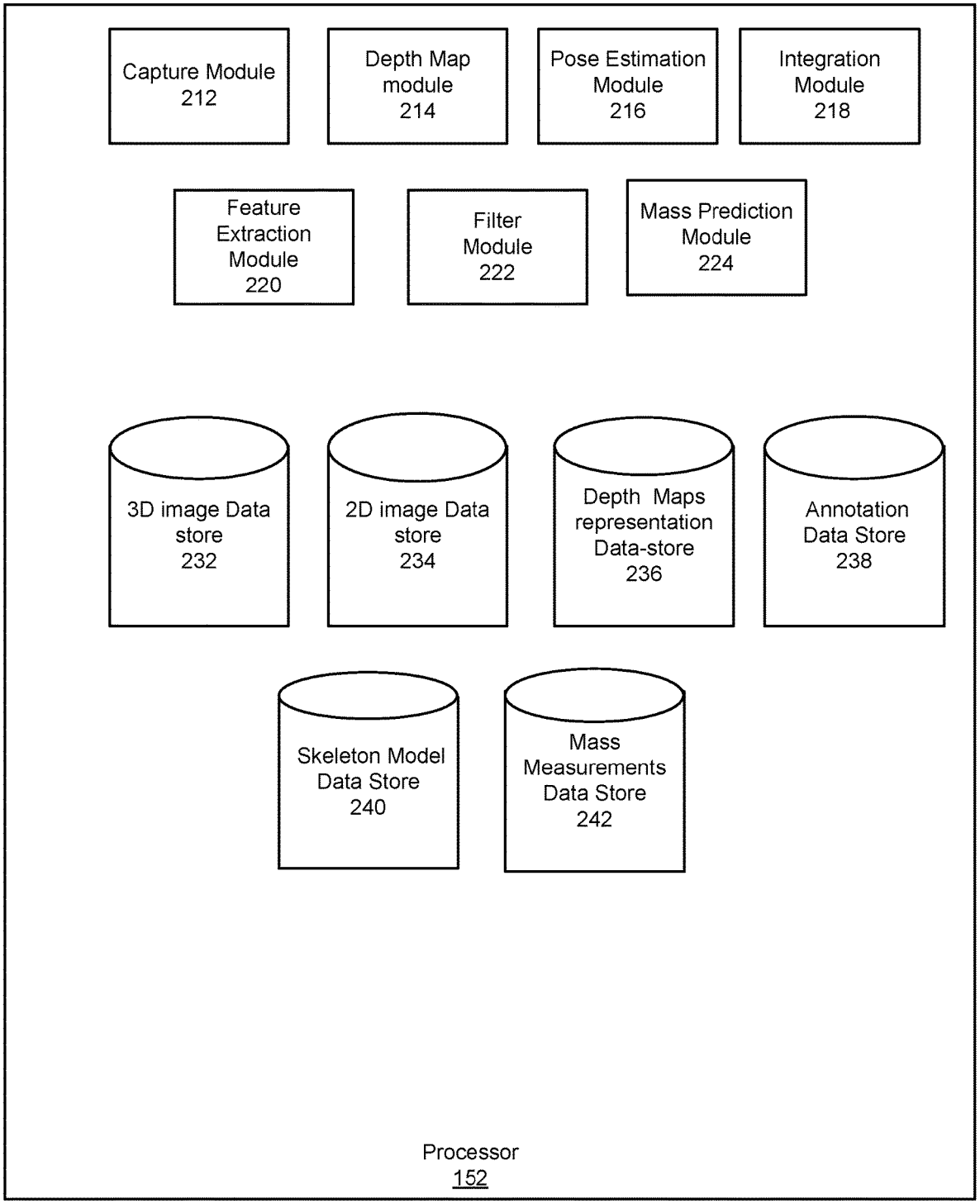
FIG. 2A is a block diagram of the processor operating in the imaging system shown of FIG. 1B, in accordance with some embodiments of the present disclosure.

FIG. 2A is a block diagram of the processor 152 operating in one or more of systems 100, 101 and 102 shown in FIGS. 1A, 1B, 1C and 1D, in accordance with embodiments. In the example shown in FIG. 2A, the processor 152 includes a capture module 212, a depth map module 214, an estimation module such as a pose estimation module 216, an integration module 218, a feature extraction module 220, a filter module 222 a mass prediction module 224 a 3D image data store 232, a 2D image data store 234, a depth maps representation data store 236, an annotation data store 238, a skeleton model data store 240 and measurements data store 242. In alternative embodiments not shown, the processor 152 can include additional and/or different and/or fewer modules or data stores. Likewise, functions performed by various entities of the processor 152 may differ in different embodiments.

In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Optionally, the modules can be integrated into one or more cloud-based servers.

The capture module 212 obtains images of a scene (e.g. vehicle interior passenger compartment) of one or more objects in a scene (e.g. one or more passengers or driver in the vehicle). In one embodiment, the processor 152 instructs one or more sensors (e.g., the imaging device 120 shown in FIG. 1C or imaging device 124 shown in FIG. 1D) to capture images of the scene for further extracting 2D and 3D data (e.g. images) of an object in a scene or the scene itself. As one example, the capture module 212 may obtain, for example synchronically and/or sequentially, a sequence of visual images (e.g. original 2D images) and images including depth data (e.g. 3D images) of the one or more objects in the scene. In accordance with embodiments, the 2D images are analyzed to determine the pose and orientation of the objects while the 3D images are analyzed to create a depth map representation of the objects as will be explained hereinbelow in detail.

In one embodiment, the capture module 212 obtains 3D images of the objects illuminated by an illuminator that projects structured light with a specific illumination pattern onto the object and/or images obtained by a stereoscopic sensor and/or a ToF sensor as illustrated hereinabove. The captured image of the object provides useful information for a future generation of a depth map. For example, the captured image of the object illuminated with the structured light includes specific pattern features that correspond to the illumination patterns projected onto the object. The pattern features can be stripes, lines, dots or other geometric shapes, and includes uniform or non-uniform characteristics such as shape, size, and intensity. In some cases, the images are captured by other sensors such as a stereoscopic sensor or ToF sensor the depth data is presented differently. An example captured image 310 illuminated with specific structured light (e.g. dots) is described in FIG. 3B. The captured image 310 includes two occupants 315 (e.g. the driver) and 325 (child passenger) seating at the vehicle front seats. In some cases, the captured images 310 and related image data (e.g., intensity, depth and gradient of each pixel) are stored in the 3D image data store 232 and the captured visual images (e.g. 2D images) and related image data are stored in the 2D image data store 234, as more fully described below.

The depth map module 214 retrieves the captured 3D image of the illuminated objects from the image 3D data store 242 and generates a depth map representation of the objects from the captured image (e.g. pattern image) of the illuminated object. As described above, a depth map representation of an object refers to an image containing information about distances of different parts of the surface of the object and/or the scene from a designated viewpoint. The designated viewpoint can be the position of a sensor that captures the image of the object. In an embodiment, the depth maps representations are stored at the Depth Maps representation data store 236 as more fully described below. An example depth map representation is further described below with reference to FIG. 3A.

In one embodiment, the depth map module 214 identifies and analyzes pattern features for deriving depth information of the captured image. Based on the identified and analyzed pattern features associated with the object, the depth map module 214 generates a depth map representation of the object. Examples of the depth information may be geometric deformation of the object due to differences of the depth of each pixel on the object in the captured image. The "depth" of a pixel on the object refers to the distance between the pixel on the actual object and the designated viewpoint (e.g., the position of the sensor).

In some embodiments, the depth map module 214 generates a depth map representation of the object in the captured image based on the triangulation between the light pattern and the image sensor, the depth of the object illuminated by the light pattern can be extracted. A detected pattern refers to a pattern that is projected onto the object and rendered in the captured image, and a reference pattern refers to the original illumination pattern provided by the illuminator. For structured light having an illumination pattern that is projected unto an object, the pattern that is detected in the captured image of the object is a distorted version of the original illumination pattern of the structured light. The distorted version of the original pattern includes shifts and other distortions due to the depth of the object. By comparing the detected pattern with the original illumination pattern, or parts of the detected pattern with the corresponding parts of the original illumination pattern, the depth map module 214 identifies the shifts or distortions and generates a depth map representation of the object.

FIG. 3A shows an example of captured image 335 including reflected light pattern spots, in accordance with embodiments. For illustration matters, each spot of the reflected light pattern spots is colored using gray scale color where each color represents the distance of the spot from a reference point (e.g. camera). For example, the scale 282 includes a grayscale color for a distance of around 40 cm from the camera and continuously the color representation changes to black scale for a distance around 140 cm from the camera and so on the color scale varies according to the distance. Accordingly, the multiple patterns spot 281 of the captured image 285 shown in FIG. 3B are analyzed to yield a depth representation image 287 of the scene as illustrated in FIG. 3A. For example, the cluster of reflected dots on the driver's legs (presented by ellipse 345) are typically around 20-50 cm from the camera while the center mass of the driver (presented be ellipse 355) is more remote from the camera (around 50-80 cm). In accordance with embodiments, the depth map module 214 receives and analyzes images of the vehicle cabin such as image 335 to extract a depth map representation including depth values for each reflected pattern location (e.g. pixel) in the captured image according to the distance of the detected pattern in the captured image from the sensor.

The pose estimation module 216 retrieves the captured original images (2D images) of the vehicle's illuminated occupying object(s) (typically one or more persons) from the 2D image data store 234 and analyzes the original images to identify the one or more persons in the images and further estimate their pose. In some cases, the identification includes generating a graphical representation such as a skeleton of points superposed on each identified person in the captured image. In some embodiments, the images including the superposed skeletons are stored at an annotation data store 238.

Figure 4A:
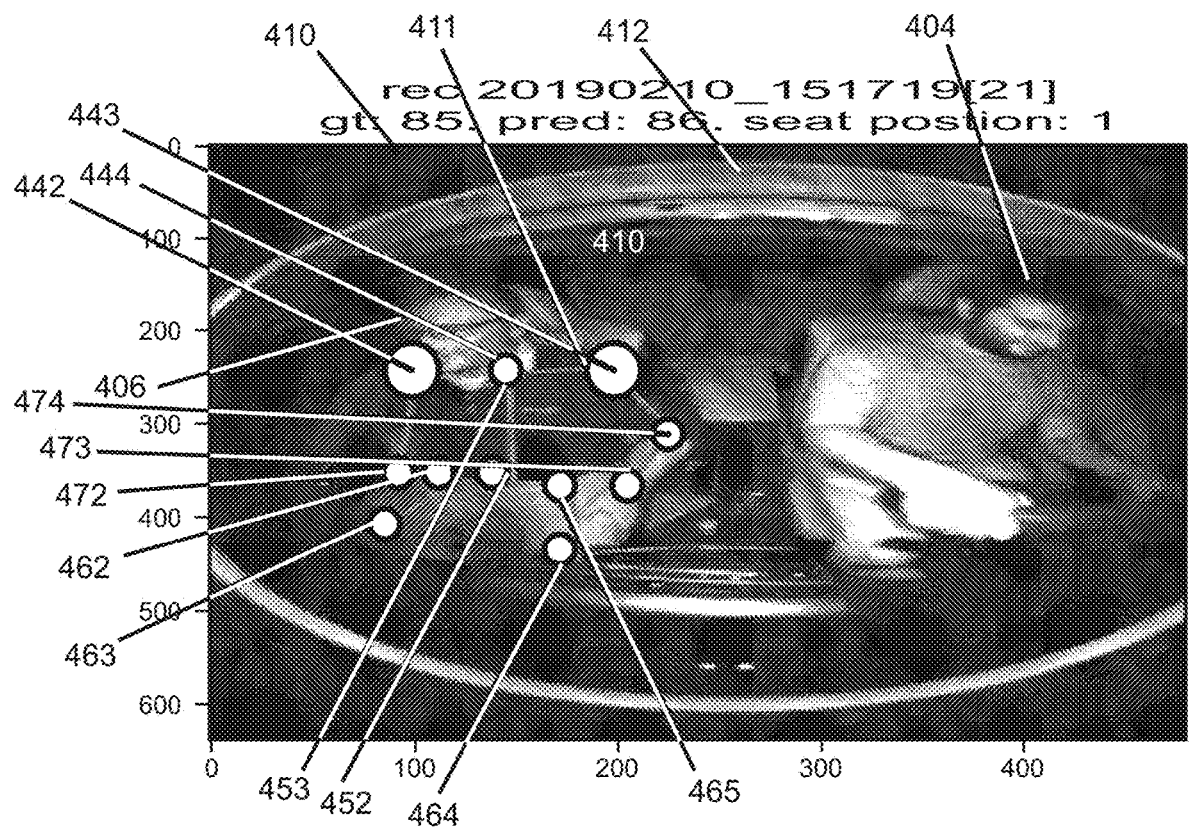
FIGS. 4A and 4B show captured image comprising a skeleton of annotations representation, in accordance with some embodiments of the present disclosure.
Figure 4B:
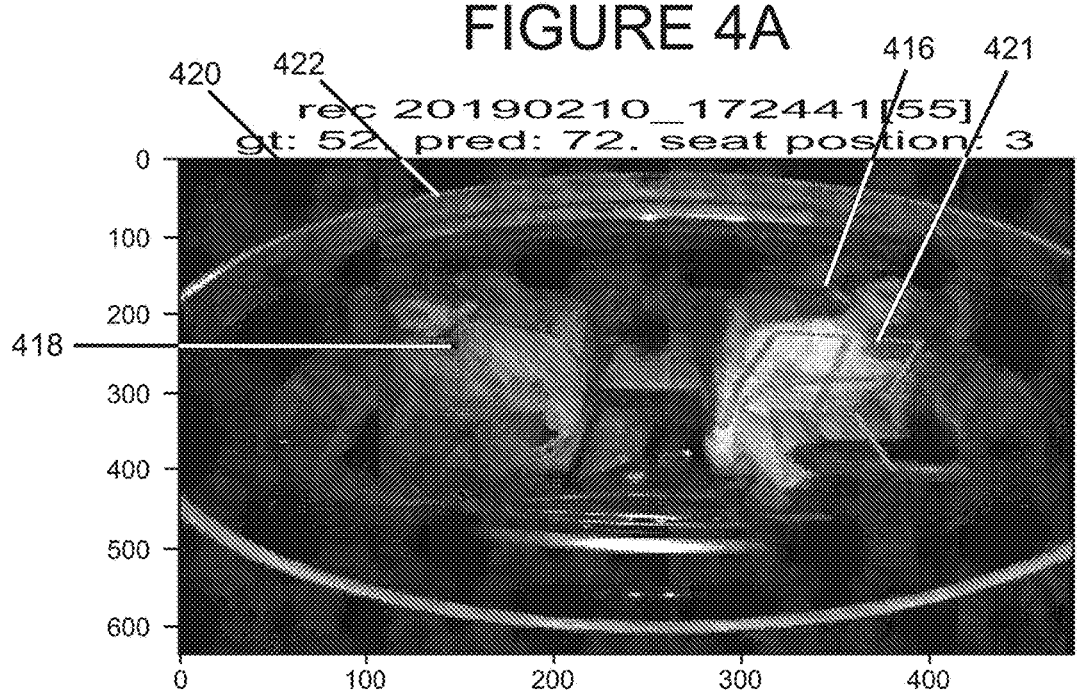
Figures 4H, 4I, 4J, 4K:
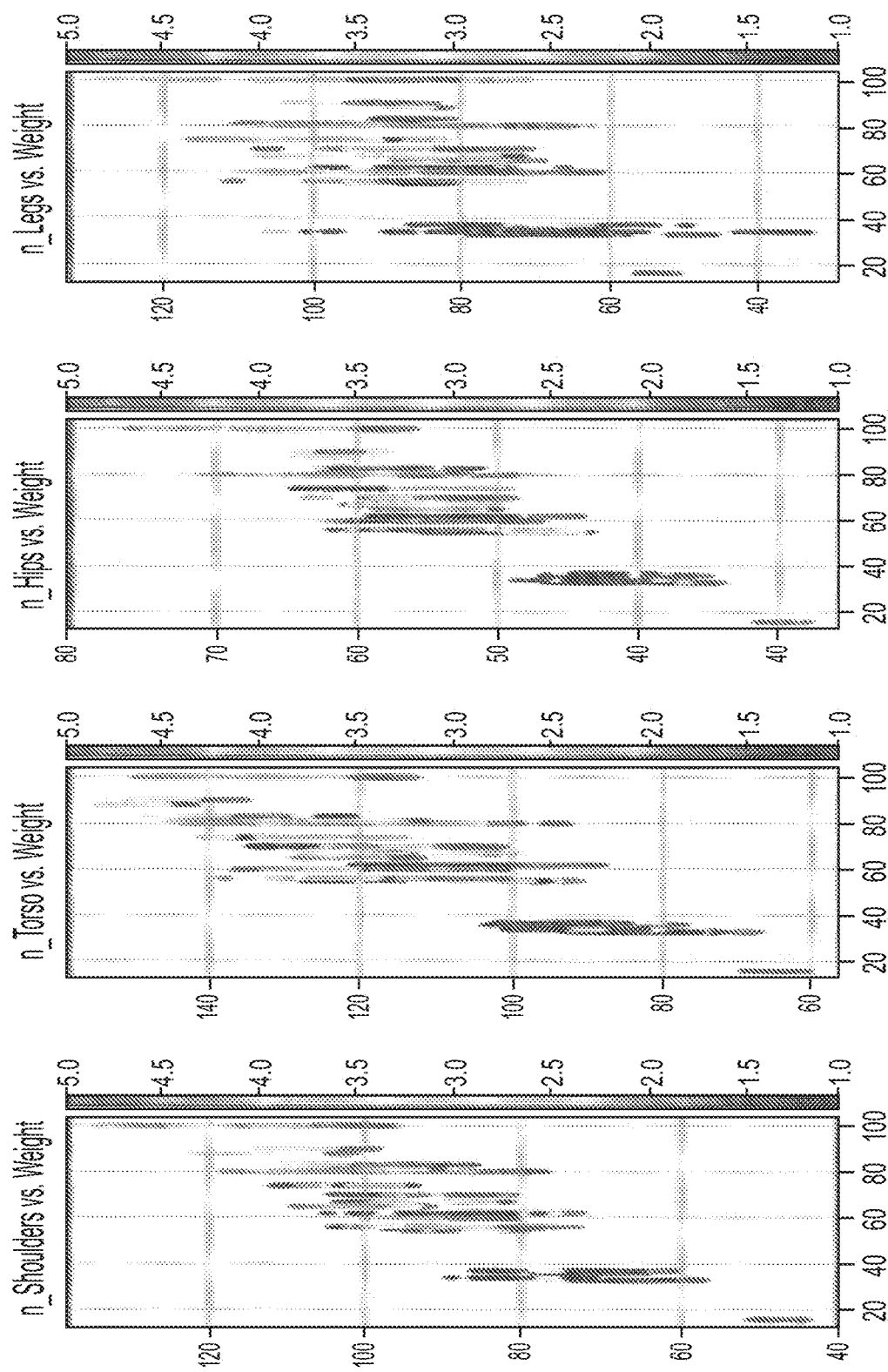
FIGS. 4H-4K show the data distribution of the measured mass of one or more occupants in a vehicle as a function of various measured body characteristic features of the occupants, in accordance with some embodiments of the present disclosure.

In one embodiment, the pose estimator module 216 uses DNN (Deep Neural Network) to identify in each retrieved image the one or more persons and superpose (e.g. mark) multiple annotations such as selected key-points locations at the identified objects. In case the objects are identified persons (e.g. passenger(s) or driver) the key-points represent body landmarks (e.g. joint body points) which are detected at the captured body image of the persons. In accordance with embodiments, the detected key-points may be graphically represented as a framework of key points or skeleton of the identified person's body. In accordance with embodiments, each key-point of the skeleton includes a coordinate (x, y) at the person(s) body image. In some cases, the skeleton is formed by linking every two key-points by marking a connection line between the two lines as illustrated in FIGS. 4A and 4B.

Figure 6:
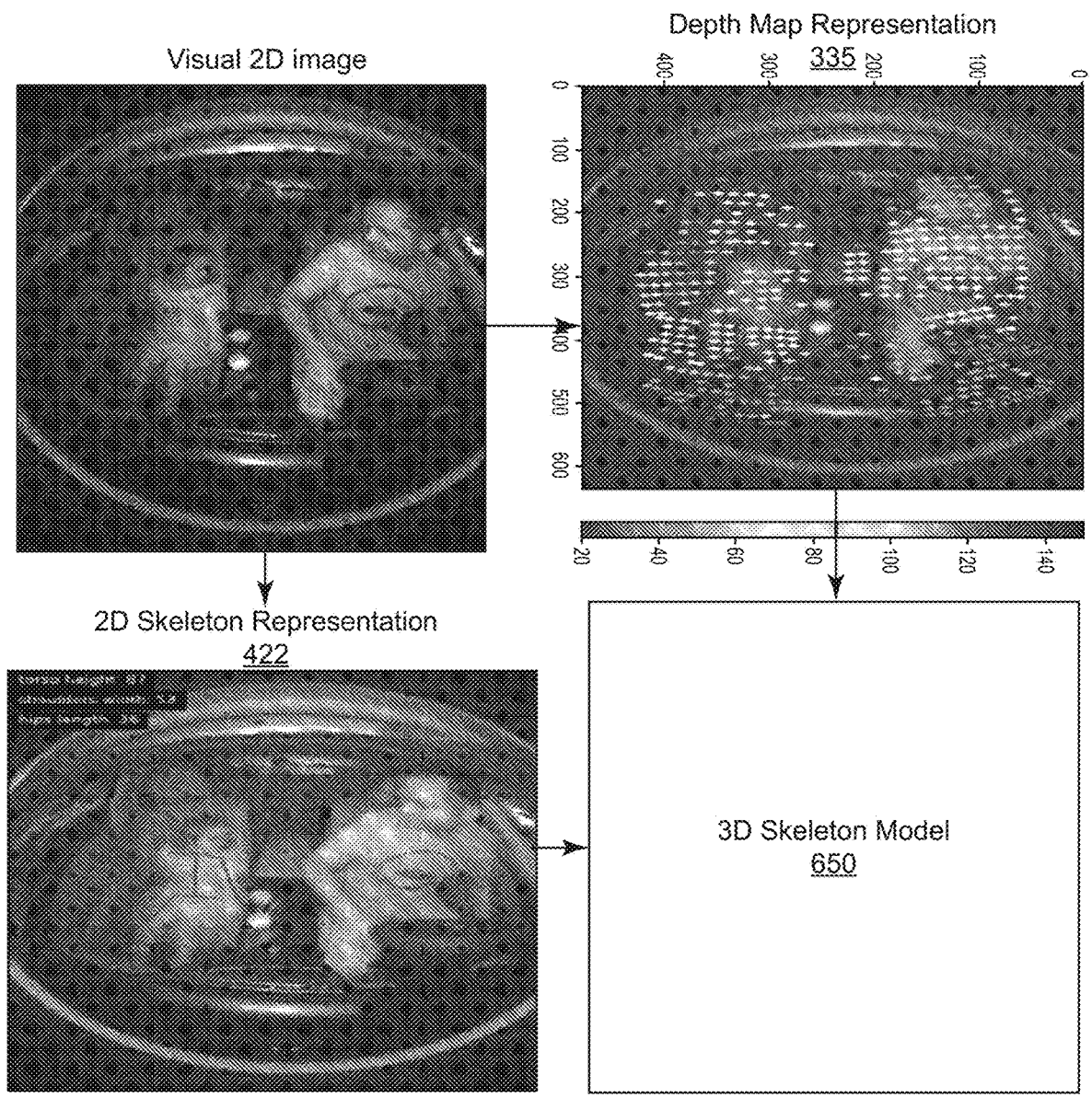
FIG. 6 is a flow diagram illustrating the generation of a skeleton model for each occupant, in accordance with some embodiments of the present disclosure.

The integration module 218 obtains the formed skeleton (e.g. 2D skeleton) and the depth maps representation of each object and combines them (e.g. mix them) to yield a skeleton model e.g. a 3D skeleton comprising 3D data for each object. In an embodiment, the integration process includes computationally combining the formed skeleton (2D skeleton) and the depth maps representation to yield the skeleton model which includes data for each key-point in the skeleton model in an (x,y,z) coordinate system. In an embodiment, the skeleton model includes depth data related to each joint key-point at the formed skeleton model, for example the location of each point of the person in the scene (x,y) and the distance (z) of such point from a respective image sensor in the (x, y, z) coordinate system. In other words, each key-point of the formed skeleton has a coordinate in the 2D image. Since the captured 2D and 3D images are co-registered to each other, it is possible in accordance with embodiments to obtain 3D value of the same coordinate in the 3D map. Hence, the Z value e.g. (distance) for some or for each key-point is obtained. An example of the combination process is illustrated in FIG. 6.

In some cases, the skeleton model data is stored at a skeleton model data store 240.

In an embodiment, the feature extraction module 220 is configured and enabled to analyze the skeleton model data and extract one or more data measurements for each related identified person at the scene. Generally, the extracted measurements include data related to the imaged persons and output derived values (e.g. features) intended to be informative and non-redundant information on the persons. Specifically, the extracted features of imaged occupants (e.g. persons) in the vehicle may include the measured length of body parts of the occupants such as the length of the occupants; torso; shoulders; width hips and pelvis location, etc.

Generally, estimating the mass of a seating person, even by human eyes, is much more difficult than estimating the mass of a standing person as major body portions of the person (such as legs knee or hands) are hidden and/or are not fully presented. Specifically, estimating the mass of an occupying object, such as a person, based on body parts measurements (e.g. skeleton measurements) in a vehicle is accordingly challenging since the person's skeleton is seen in a highly non-standard pose, e.g. seating position or "crouching" positions. There is a need, in accordance with an embodiment, to identify these non-standard poses (e.g. "crouching" positions) and avoid using them in the mass estimation process to yield an accurate mass estimation. In accordance with embodiments, the filter module 222 is configured to solve this matter by obtaining images including skeleton model data of the objects from the skeleton model data store 232 and filter out one or more of the obtained images based on predefined filtering criteria such as predefined filtering criteria. The remained valid images including skeleton model data (e.g. valid skeleton model data), may be kept at the skeleton model data store 240 for further determining the mass of the objects.

In some cases, the predefined filtering criteria includes specific selection rules which define a valid pose, posture or orientation of the objects and further discard 'abnormal' poses. In accordance with an embodiment, an 'abnormal' pose may be defined as an object's body pose (e.g. marked by the skeleton model) or body portion which do not reflect or present the complete or almost complete major portions of the object. Nonlimiting examples of filtering criteria include: defined spatial relation between skeleton features of the identified objects and/or identified abnormal poses; short imaged body portions length, object image position located away from an high-density area.

In accordance with embodiments, the defined spatial relation between skeleton features of the identified objects include, for example, predefined relation between the object portions. Specifically, in cases where the object is an occupant seating in a vehicle, the criteria include defined spatial relation between the occupant body parts, such as a relation between the occupant's shoulders and torso or hands; a relation between the torso and knees in a seating position, and the like. In some cases, the spatial relation between the measured skeleton occupants body organs (e.g. knees; shoulders; hands) is measured and compared to predefined body proportion parameters, (e.g. in a seating position). For example, as illustrated in FIG. 5B the spatial relation between the shoulders and torso of driver 522 do not match a predefined proportional parameter, and therefore image 501 will be discarded. In some cases, data relating to the occupant's body proportions and features is stored at the annotation data store 238 and is retrieved by the filter module 222 to accordingly discard or confirm captured images and/or skeleton models of the occupant.

In accordance with embodiments, the high-density filtering criteria includes generating a high-density model (e.g. high dimensional space vector such as an eight-dimensional vector) according to measured parameters of one or more vehicle's parameters. The high-density model may include for each key-point (body joint) of an identified person an allowed region in the captured image which the key-point may be located. If the key point is identified by the high-density model to be out of this region then this image is discarded. The allowed region for each joint is provided by analyzing images with good "standard" sitting positions.

In some cases, the generated high-density parameters are stored at the sensing system such as systems 100, 102 or 103 (e.g. at processor 152 or storage 154 or at a remote processor or database such as cloud data store). Then, each of the generated skeletons is placed at and/or compared to the generated high-dimensional space to determine the location in space of the skeleton in respect to the high-density model. Accordingly, images that include skeletons that are not within a predetermined distance from the high-density area in this space are discarded. For example, a generated skeleton which is located far from the density center will be filtered out.

The mass prediction module 224 obtains the valid images of the objects from the skeleton model data store 240 and analyzes the valid images to determine the mass of the objects, in accordance with embodiments. In some embodiments, the analysis includes inserting the extracted features of the valid skeleton data to a regression module such as a pre-trained regression module configured and enabled to estimate the mass. In some cases, the pre-trained regression module may use "decision trees" trained according to for example XGBoost methods, where each decision tree represents the measured mass of an object in each captured image according to the measured features of the object. For example, each formed tree may include data on a captured occupant's features such as the occupant's shoulder length; torso length; knees length which was measured based on valid images. In accordance with embodiments, the occupant's mass estimation process is optimized using the pre-trained regression module to provide the most accurate mass prediction (e.g. estimation prediction) for each captured object (e.g. persons). It is understood that in accordance with embodiments other types of pre-trained methods may be used.

In some embodiments, the measured mass of each object is stored at the Mass measurements data store 242 as more fully described below.

The 3D image data store 232 of the processor 152 stores captured 3D images of specific objects (e.g. persons) or scenes (e.g. vehicle cabin) and image data related to the captured images. In an embodiment, the captured 3D images stored in the 3D image data store 232 can be images including specific pattern features that correspond to the illumination patterns projected onto the object. For example, the images may include one or more reflected spots as illustrated in FIG. 3A. In other embodiments, the 3D images may be images obtained from a stereoscopic camera or a ToF sensor or any known 3D capturing devices or methods.

The depth map data store 234 of the processor 152 stores depth map representations and related data of an object generated by the depth map module 214. For example, the depth map data store 234 stores the original depth map representation and related depth data as well as enhanced depth map representation and related depth data. As described above, the original depth map representation refers to the depth map representation that is derived from the original captured image.

The depth map representation data store 236 of the processor 152 stores depth map representations and related data of the objects generated by the depth map module 214. For example, the depth map data store 234 stores the original depth map representation and related depth data as well as enhanced depth map representation and related depth data. Specifically, in some cases, the related data may include image representation of light patterns of the image according to the measured distance of each image pixel from the image sensor.

The annotation data store 238 of the processor 152 stores skeleton representations and related data of the objects generated by the pose estimation module 216. For example, the annotation data store 234 stores the original 2D images and the related superposed skeleton for each object. According to one embodiment, the annotation data store 234 may further store related data for each pixel or key-point at the skeleton such as one or more confidence grades. The confidence grade may be defined as the intensity level of a key points heat map, as identified for example by the pose estimation module 216. For example, the pose estimation module 216 may include or use a DNN to provide a "probability heat map" for some or for each key point at the captured image. In an embodiment, the "probability heat map" for each key point may be stored for example at the annotation data store 238. For each skeleton point, the DNN (e.g. the pose estimation module 216) states how confident, relevant and accurate the location of the generated key-point of the skeleton is, by adjusting the intensity of the maximal point in the probability map. For example, as illustrated in FIG. 4A for each key point at skeleton 411 (e.g. key points 442, 443, 444, 452, 453, 462, 463, 464, 465, 472 473 and 474) a probability heat map is generated relating to the confidence rating of the DNN. The probability heat map may be further used for example with the density criteria score to determine the confidence grade of the skeleton key points and accordingly to approve or discard captured images.

In some cases, the original images are divided according to the identified object in the image. For example, captured images of a vehicle cabin are separated to one or more images per each of the vehicle's seats (e.g. front or back seats).

FIGS. 4A and 4B show, respectively, examples of captured images 410 and 420 of a vehicle interior passenger compartment 412 and 422 including two imaged occupants, a driver 404 and a passenger 406 in image 410 and a driver 416 and passenger 418 in image 422. In an embodiment, the images 410 and 420 are captured by an imaging device mounted on the front section of the vehicle, for example on or in proximity to the front centered mirror. In an embodiment, the pose estimator module 242 retrieves the captured original visual images of the illuminated objects (e.g. occupants 404, 406, 416 and 418) from the 2D image data store 244 and generate skeletons on the persons in the image (e.g. skeletons 411 and 421 on the captured images 410 and 420). For example, as illustrated in FIG. 4A, the object in the left side of the captured image 410 is identified as a person (e.g. passenger 406) seating on the vehicle passenger front seat with a skeleton 411 superposed on the passenger's center body. In an embodiment, the pose estimation module 216 is configured to identify and localize major parts/joints of the passenger body (e.g. shoulders, ankle, knee, wrist, etc.) by detecting landmarks on the identified object (e.g. key-points) and linking the identified landmarks by connection lines. For example, as shown in FIG. 4A the skeleton generation process by the pose estimation module 246 includes identifying key-points 442 and 443 linked by line 444 for estimating the passenger shoulder; identifying key-points 452 and 453 for estimating the passenger's torso; identifying key-points 462, 463, 464 and 465 for estimating the passenger knees; identifying key-points 472 473 and 474 for estimating the passenger right hand and key-points 482 and 483 for estimating the passenger's left hand. In accordance with embodiments, the key-points are obtained by a DNN trained to identify the specific key-points.

In some cases, for each identified key-point a "probability map" is applied to yield a confident grade which defines the accuracy of the identified key-point.

In some cases where the vehicle includes a number of seats (e.g. back seats, front seats, driver seats, baby seat and the like) and the captured image includes a number of occupants seating on the different seats, the module may identify, for example separately, each seat and the occupant seating on the identified seat for generating accordingly for each object (e.g., passenger and/or driver) a skeleton. For example, as shown in FIG. 4B the driver seat and driver may be identified and accordingly, a second skeleton may be superposed on the identified driver.

In accordance with embodiments, once a skeleton representation is generated for one or more objects for example for each object, for example by one or more processors (e.g. processor 152), one or more skeleton properties of the objects are analyzed to estimate the object's mass. For example, as illustrated in FIGS. 4C-4G an image 480 of the vehicle interior cabin back seat including two occupants 482 and 484 are captured. For example, image 480 may be one frame of a plurality of captured frames of a vehicle cabin. In accordance with embodiments, a skeleton 486 superposed on occupant 484 is analyzed to yield the occupant's body (e.g. skeleton) properties such as the length of the occupant 484 shoulders (FIG. 4C), hips (FIG. 4D), torso (FIG. 4E), legs (FIG. 4F) and center of mass (FIG. 4G). In some cases, the occupant's mass is estimated based on these five measured skeleton portions. In other embodiments, different and/or additional body organs of the occupant or elements in the occupant's surroundings may be measured.

FIGS. 4H-4K show data distribution of the estimated mass of one or more occupants in a vehicle as a function of various measured body characteristic features of the occupants, such as shoulders (FIG. 4H), torso (FIG. 4I), hips (FIG. 4J) and legs (FIG. 4K), in accordance with embodiments. The verticals lines at each graph of FIGS. 4H-4K, represent one or more subjects moving around the identified object. The mass estimation for each body portion, e.g. torso length estimation of FIG. 4I, includes noise and changes from image to image for the same object (e.g. person's torso). Advantageously, combining different measurements of different body parts of the same object yields an accurate mass estimation.

It should be stressed that some of the graphs in FIGS. 4H-4K include less data as a result of less robustness measurement such as the occupant's legs measurements.

In one embodiment, the pose estimation module 216 processes each of the images using one or more filters, obtained for example from the filter data store, to check and generate a confidence grade. The confidence grade is based on the reliability and/or accuracy of the formed skeleton, and is used specifically for examining the reliability and accuracy of each identified key-point. In some cases, the confidence grade may be determined based on the confidence grading rating as measured by the pose estimation module 216 (e.g. DNN) and the density criteria score as measured using a pose density model.

In accordance with embodiments, the pose density model obtains the skeletons of each image from the pose estimation module 216 and places each of the object's skeleton configuration in a high-dimensional space for discarding any configurations which are within a predetermined distance from a high-density area in this space. In some cases, the distance is determined by the Euclidean distance between an 8-vector of the current frame's key points and the average points calculated from the complete training data. In one embodiment, the confidence rate is configured based on the skeleton's local density in the skeleton space. In some cases, temporal smoothing is performed on the obtained estimation, to reduce noise and fluctuations.

Figure 2B:
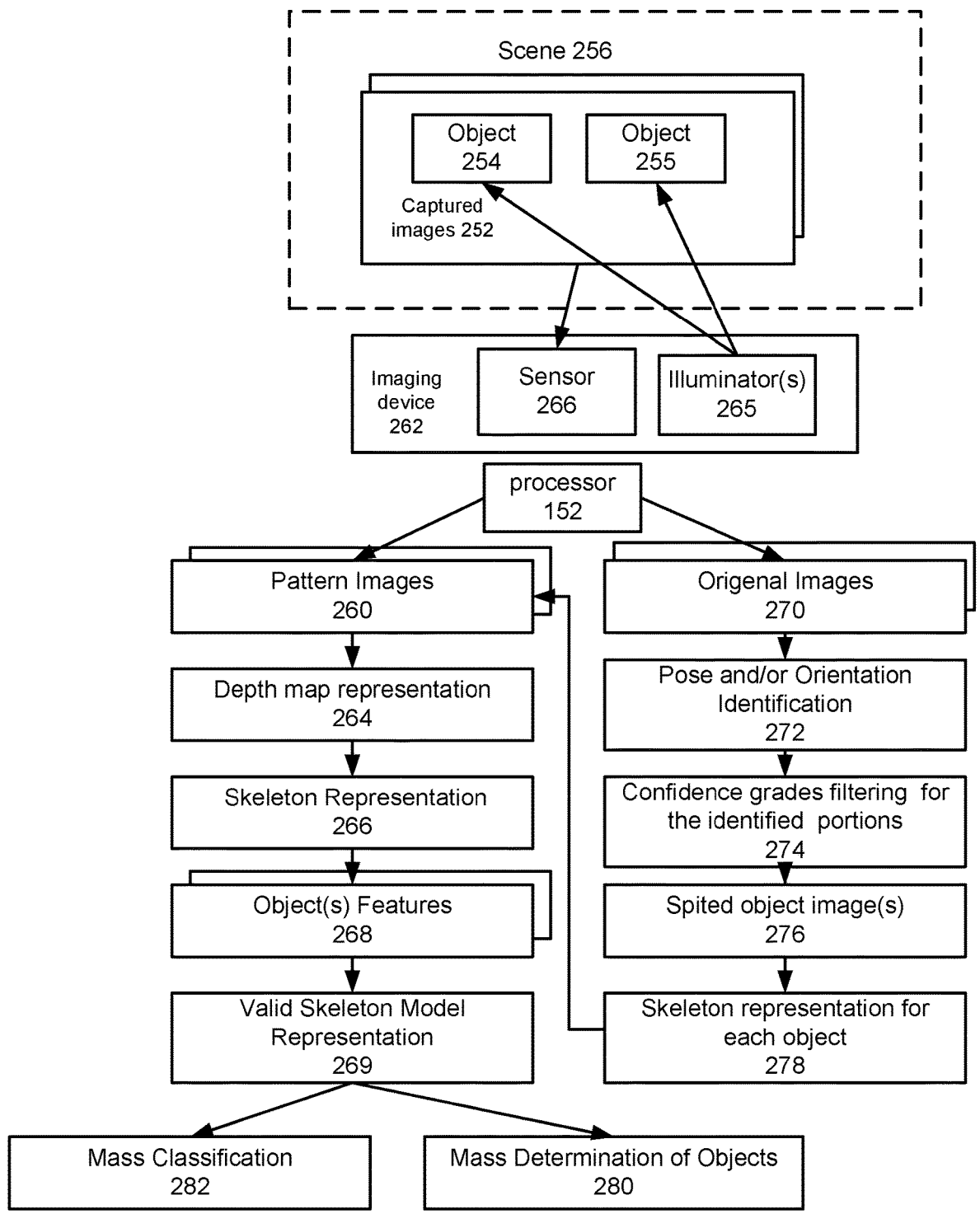
FIG. 2B is a flow diagram illustrating the steps of capturing one or more images of one or more objects and estimating the mass of the objects, in accordance with some embodiments of the present disclosure.

FIG. 2B is a flow diagram 250 illustrating steps of capturing one or more images 252 of one or more objects, such as objects 254 and 255 in scene 256 and estimating the mass of the objects, according to one embodiment. In some cases, the scene may be a vehicle interior passenger having one or more seats and the objects are one or more passengers and/or driver seating on these seats. As shown in FIG. 2B, an imaging device 262 comprising one or more illuminators 265 provides structured light with a specific illumination pattern (e.g., spots) to the objects 254 and 255 in scene 256 and a sensor 266 captures one or more images of the objects 254 and 255 in scene 256. In other embodiments, device 262 may be or may include a stereoscopic imager or a ToF imager. For example, the imaging device may be a ToF imaging device and the illuminator comprises an illumination source configured to project light on the scene and the sensor is a ToF sensor configured to capture a plurality of images comprising reflections of said modulated structured light pattern from one or more objects in the scene. In some cases, the imaging device 262 may be a stereoscopic imaging device including a stereoscopic imager as known in the art.

In various embodiments, the projected light pattern may be a pattern of spots that for example uniformly cover the scene or selective portions of the scene. As the light is projected into the scene, spots from the light pattern fall onto one or more objects of interest. In some cases, the light is projected by the illuminator 265 using diffractive optical element (DOE) to split a single laser spot to multiple spots as described in FIG. 1B. Other patterns such as a dot, a line, a shape and/or a combination thereof may be projected on the scene. In some cases, the illumination unit doesn't include a DOE.

In some cases, each reflected light pattern (e.g. spot) is covered by one or more of the sensor pixels 266. For example, each spot may be covered by a 5×5 pixel window.

In one embodiment, a processor 152 may instruct the illuminator 265 to illuminate the objects 254 and 265 with specific modulated structured light. One or more reflected pattern images 260 and clean images 270 (e.g. visual images which do not include reflected light pattern) are provided to the processor 152 to generate a depth map representation 264, and skeleton model representation 266 of the objects 254 and 255. To generate the skeleton model representation 266 for each of the objects 254 and 255, the processor 152 first identifies the pose and/or orientation of the captured objects (272) in the original images (270) by correlating each point in the scene space 256 to a specific portion of an object. For example, in case the objects 254 and 255 are two vehicle passengers (e.g. persons) each point or selected points in the passenger image are linked to a specific body organ, such as legs, torso, etc. The processor 152 then filters the identified points by examining the reliability of each identified object based for example on the measured confidence grade (as described above) and applying a confidence grade for each identified point in space (274). Thereafter, in some cases, the processor 152 splits the captured images to one or more images (276) according to the identified pose and/or orientation and/or confidence grade of the identified objects to generate the skeleton representation (278) for each identified object. In some cases, the position and orientation of the object may be detected and measured by applying an OpenPose algorithm on the images and/or other DNN algorithms such as DensePose configured to extract body pose.

In accordance with embodiments, to generate the depth map representation 264 of the objects 254 and 255, the processor 152 analyzes the reflected pattern features rendered and/or ToF data and/or stereoscopic data in the captured images 260 to yield the depth, e.g. distance, of each reflected pattern from a reference point. In some cases, the pattern is a spot shaped pattern and the generated depth map representation 264 comprises a grid of points superposed on the captured images 252 where each point indicates the depth of the surfaces of the images, as illustrated in FIG. 3A. The processor 152 then integrates (e.g. combine) the depth map representation (264) with the skeleton annotation representation (278) to yield a skeleton model representation (266) for each of the objects. In accordance with embodiments, the skeleton model representation (266) of each object is then analyzed by the processor 152 to extract objects features (268) such as the length or width of body portions in case the identified objects are persons. Nonlimiting examples of extracted features may include body portion length of the object, such as shoulder, torso knees length.

In some embodiments, the processor 152 filters the skeleton model presentation images, according to predefined filtering criteria to yield one or more valid skeleton model presentations (269). In some cases, the filtering criteria are based on the measured confidence rating of each identified point and on one or more selection rules as described herein in respect to FIG. 2A. In some cases, a grade is assigned to each analyzed frame reflecting the accuracy and reliability of the identified objects shape and position.

In accordance with embodiments, based on the extracted features the processor 152 determines the mass of each object (280). For example, the extracted features for each captured images are inserted into a massing model such as a pre-trained regression massing model which receives the extracted object features for each obtained image over time (t) to determine the mass of each object in the scene (280) or mass classification (282). In an embodiment, the massing model considers previous mass predictions, as obtained from previous image processing steps, to select the most accurate mass prediction result. In some embodiments, the massing model also takes into account the measured grade for each skeleton model and optionally also the provided confidence grades to yield the most accurate mass prediction result.

In some embodiments, a temporal filter is activated to stabilize and remove outliers, so that a single prediction is provided at each timestamp. For example, temporal filtering may include removing invalid images and determine a mass prediction based on previous valid frames. If the required output is a continuous mass value (e.g. which may include any numeric value such as 5,97.3,42.1 60 . . . etc.), then it is the temporal filter's output.

Alternately or in combination, a mass classification (282) for each identified object in the scene, such as objects 254 and 255 may be determined in accordance with a number of pre-determined mass categories, e.g. child; teenager; adult. For example, a vehicle passenger weighing 60 kg, and/or between 50-65 kg will be classified "small adult" or "teenager", while a child weighing 25 kg or in the range of 25 kg will be classified as "child".

Figure 5A:
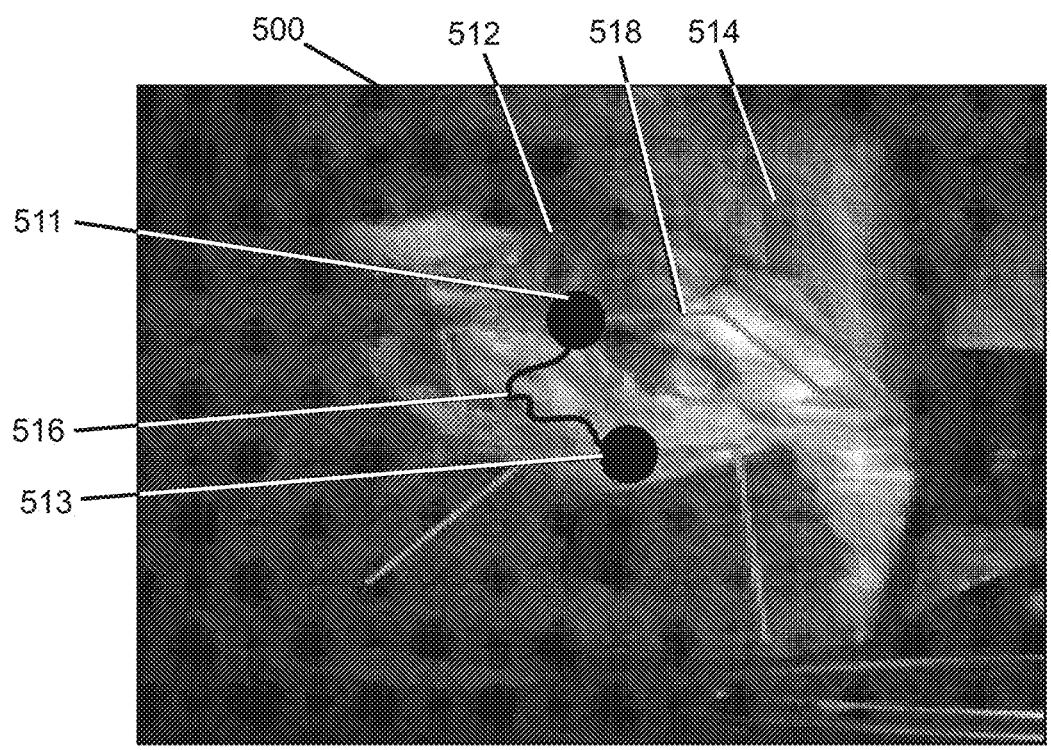
FIGS. 5A and 5B illustrate examples of captured images of an interior passenger compartment of a vehicle which are filtered out based on the predefined filtering criteria, in accordance with some embodiments of the present disclosure.
Figure 5B:
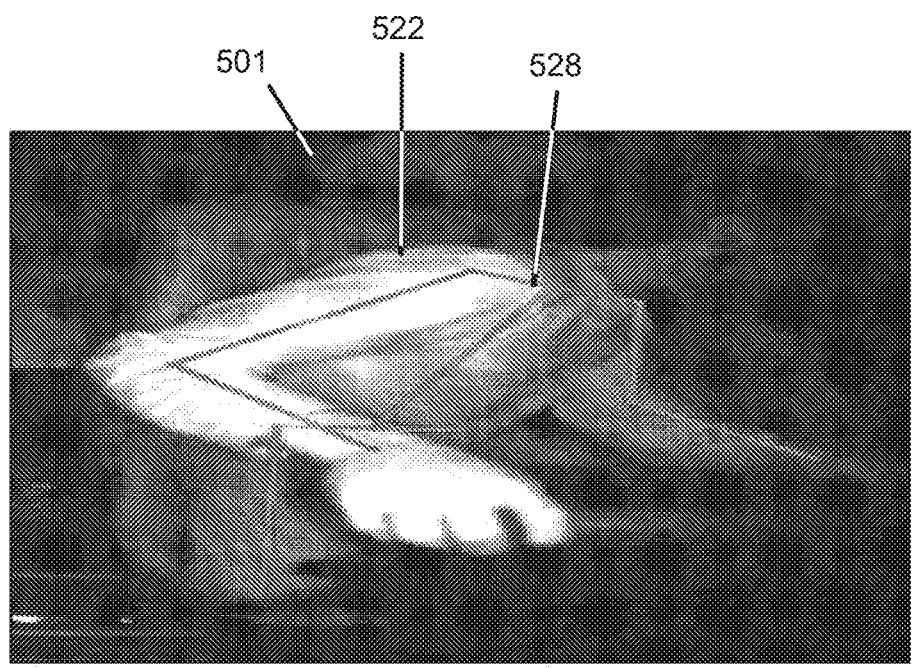

FIGS. 5A and 5B illustrate examples of captured images 500 and 501 of an interior passenger compartment of a vehicle which are filtered out based on the predefined filtering criteria, in accordance with embodiments. As shown in FIG. 5A and FIG. 5B each of the obtained images 500 and 501 comprise a graphical skeleton presentation formed by a number of lines superposed on the occupant's major body portions. In accordance with embodiments, each of these skeletons is analyzed to discriminate images comprising 'abnormal' or 'non-valid' poses and keep selected images (e.g. valid images including valid poses) which will be used for further accurate occupant's mass measurement calcification.

FIG. 5A shows a captured image 500 of a passenger 512 seating on a passenger front seat of a vehicle which will be filtered out based on the predefined filtering criteria, such as due to the short measured torso. Specifically, as illustrated in image 500, the passenger 512 is leaning forward with respect to an imaging sensor, and accordingly, the measured passenger's torso length 516 (e.g., the length between the neck and the pelvis measured between the skeleton points 511 and 513) of the skeleton 518 is short relative to the shoulders' width. As the mass estimation based on such position shown in image 500 is difficult and inaccurate (due to the short measured torso as defined in the predefined filtering criteria), this image will be filtered out from the captured images of the vehicle cabin.

FIG. 5B shows a captured image 501 of a driver 522 seating on a driver seat of the vehicle and a formed skeleton 528 superposed on the driver's upper body. In accordance with embodiments, image 501 will be filtered out from the list of captured images of the vehicle cabin since the captured image of the driver body as emphasized by skeleton 528 is located far from the high-density area Specifically, the body image of the driver is located at a low-density area in the "skeleton configuration space" (e.g. the skeleton was fitted far from the density center), meaning the body of the identified person is leaning out of the "standard" sitting position, and hence the joints are further than the allowed position.

FIG. 6 is a flow diagram 600 illustrating the generation of a skeleton model (3D skeleton model 650) of the occupants shown in FIG. 3B by combining the depth map representation 335 of the occupants shown in FIG. 3B and the 2D skeleton representation image 422 of the occupants shown in FIGS. 4A and 4B, according to one embodiment. As shown in FIG. 6, the captured image 325 renders pattern features on the captured occupants (e.g., a person). The depth map representation 335 of the occupants are derived from the captured image 325 of the occupants, where the depth map representation 335 of the occupants provide depth information of the occupants while the 2D skeleton representation 422 provides pose, orientation and size information on the occupants. The skeleton model 650 is created by combining the depth map representation 335 of the occupants and the 2D skeleton representation 422 of the object. In accordance with embodiments, the skeleton model 650 is created by applying a depth value (calculated for example from the nearest depth points that surround that point) to each skeleton key point. Alternatively or in combination, average depth in the region of the skeleton can be provided as a single constant number. This number may be used as a physical "scale" for each provided skeleton as further explain in respect to FIG. 8.

FIG. 7A is a schematic high-level flowchart of method 700 for measuring the mass of one or more occupants in a vehicle, in accordance with embodiments. For example, the method may include determining the mass of one or more occupants sitting on a vehicle seats, for example in real time, according to one or more mass classification categories and accordingly outputting one or more signals to activate and/or provide information associated with the activation of one or more of the vehicles units or applications. Some stages of method 700 may be carried out at least partially by at least one computer processor, e.g., by processor 152 and/or vehicle computing unit. Respective computer program products may be provided, which comprise a computer readable storage medium having computer readable program embodied therewith and configured to carry out of the relevant stages of method 700. In other embodiments, the method includes different or additional steps than those described in conjunction with FIG. 7. Additionally, in various embodiments, steps of the method may be performed in different orders than the order described in conjunction with FIG. 7A.

In some embodiments, some of the steps of the method are optional, such as the filtering process.

At step 710 multiple images including one or more visual images, for example, a sequence of 2D images, and a sequence of 3D images of the vehicle cabin are obtained, in accordance with embodiments. The obtained sequence of 2D and 3D images include images of one or more occupants such as a driver and/or passenger(s) seating in the vehicle rear and/or back seats. In accordance with some embodiments, the 3D images are images including reflected light pattern and/or ToF data and/or any stereoscopic data while the 2D images are clean original visual images which do not include additional data such as reflected light pattern. In some embodiments, the multiple images (e.g. 2D and 3D images) are captured synchronically and/or sequentially by an image sensor located in the vehicle cabin, for example at the front section of the vehicle as illustrated in FIG. 1A. In some cases, the images are obtained and processed in real-time.

At step 720 one or more pose detection algorithms are applied on the obtained sequence of 2D images to detect the pose and orientation of the occupants in the vehicle cabin. Specifically, the pose detection algorithms are configured to identify and/or measure features such as position; orientation; body organs; length and width of the occupants. For example, the position and orientation of the object may be detected and measured by applying an OpenPose algorithm on the images and/or Dense-pose. Specifically, in accordance with embodiments, a Neural Network such as a DNN (Deep Neural Network) is applied for each obtain 2D image over time (t) to generate (e.g. superpose) a skeleton layer on each identified occupant. The skeleton layer may comprise multiple key-points locations which describe the occupant's joints. In other words, the key-points represent body landmarks (e.g. joint body points) which are detected at the captured body image forming the skeleton representation as shown in FIGS. 4A and 4B. In accordance with embodiments, each key-point of the skeleton representation includes an identified coordinate (x, y) at the occupant(s) body image to be used for extracting features of the identified occupants.

In some embodiments, the pose estimation methods may be further used to identify the occupants and/or occupant's seat in each of the obtained 2D images.

In some embodiments, the pose estimation methods are configured to extract one or more features of the occupants and/or the occupant's surroundings such as the occupant's body parts and the locations of the occupant's seat.

In some embodiments, the identified occupants are separated from one another to yield a separate image for each identified occupant. In some embodiments, each separated image includes the identified occupant and optionally the occupant surroundings such as the occupant's seat.

In some embodiments, each obtained 2D image of the sequence of 2D images is divided based on the number of identified occupants in the image so a separated skeleton is generated for each identified occupant.

In some embodiments, a confidence grade is assigned to each estimated key-point is space (e.g. vehicle cabin).

At step 730 the sequence of 3D images is analyzed to generate a depth map representation of the occupants, in accordance with embodiments. The captured 3D images of the object illuminated with the structured light include specific pattern features that correspond to the illumination patterns projected onto the object. The pattern features can be stripes, lines, dots or other geometric shapes, and includes uniform or non-uniform characteristics such as shape, size, and intensity. An example captured image illuminated with specific structured light (e.g. dots) is described in FIG. 3A.

At step 740, the 3D map representations and the skeleton annotation layers of each occupant for each image are combined to yield a skeleton model (3D skeleton model) for example for each occupant, in accordance with embodiments. Generally, the generated skeleton model is used to identify the orientation/pose/distance of the occupants in the obtained images from the imaging device. Specifically, the skeleton model includes data such as 3D key points (x,y,z) representation of the occupants in respect to a X-Y-Z coordinate system, where the (x,y) point represent the location at the occupant's body joins surface in the obtained images and (z) represent the distance of the related (x, y) key-point surface from the image sensor.

Figure 7B:
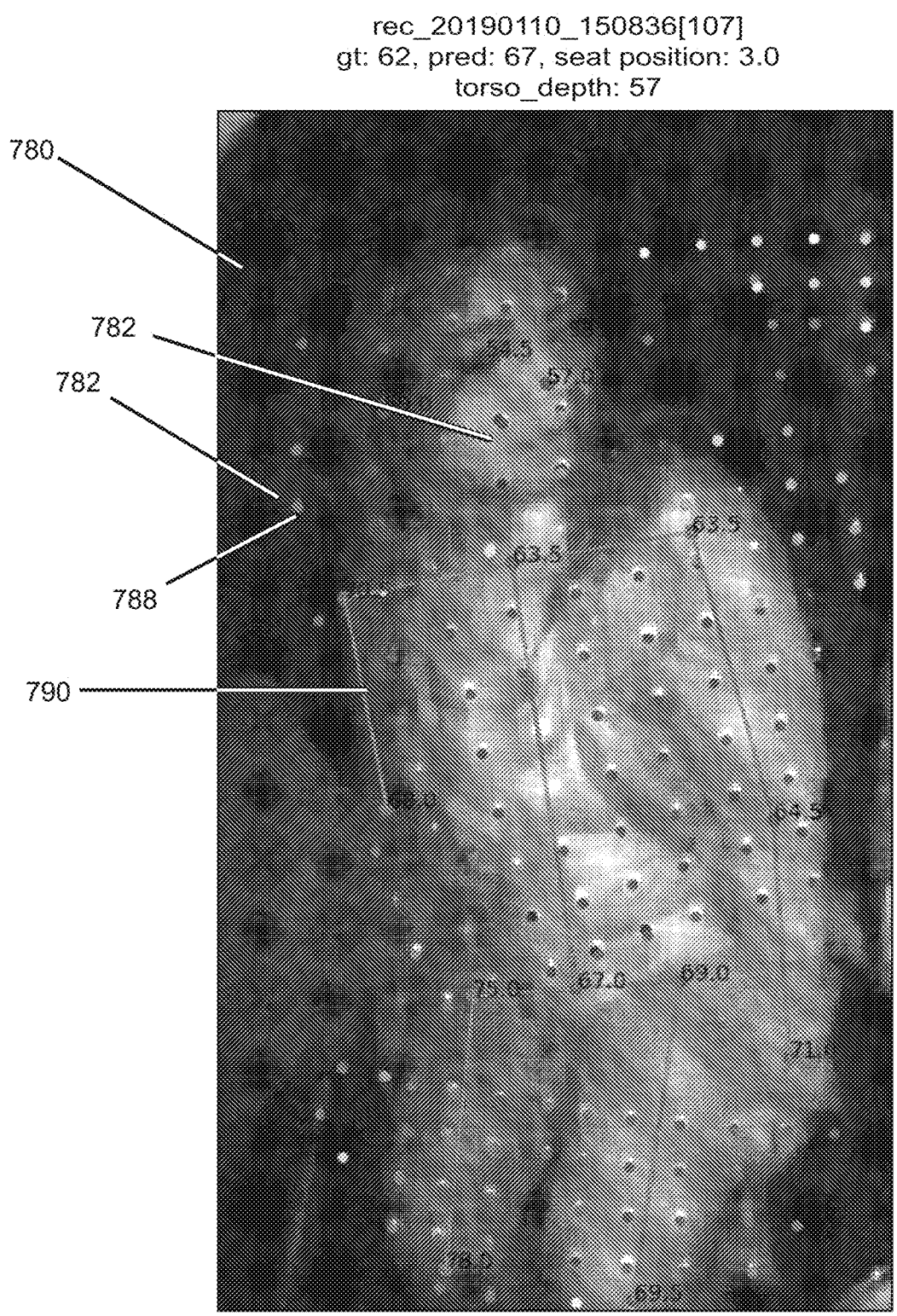
FIG. 7B shows an image including the combined 3D map layer and the skeleton layer of a vehicle interior passenger compartment, in accordance with some embodiments of the present disclosure.

For example, FIG. 7B shows an image 780 including the combined 3D map layer and the skeleton layer of a vehicle interior passenger compartment 782 in accordance with embodiments. The image 780 shows a passenger 785 seating at the vehicle seat and multiple reflected light pattern (e.g. dots) 788 used for estimating the distance (e.g. depth) of each related body portion from the image sensor. The image further includes a skeleton 790 formed by connecting a number of selected pairs of key-points at the passenger body by connection lines.

It should be stressed that while steps 730 and 740 of FIG. 7A includes obtaining reflected light pattern images to yield depth data for each image, the present invention may include obtaining 3D images and/or extracting depth data by any type of 3D systems, devices and methods, such as stereoscopic cameras or ToF sensors as known in the art.

At step 750 the skeleton models are analyzed to extract one or more features of the occupants. In an embodiment, the extracted features may include data such as measured pose and/or orientation of each occupant in the vehicle. In some embodiments, the features may further include the length of one or more body parts of the occupants, such as major body parts of the occupant, e.g., shoulders, hips, torso, legs, body, etc. Advantageously, the generated skeleton model provides the "real length" (e.g. or actual length) of each body portion as opposed to "projected length" that can be obtained if only 2D images of the persons were obtained. The analysis based on the 3D data improves the accuracy of the mass estimation as "projected length" is very limited in providing mass estimation (e.g. sensitive for angle etc.) For example, as shown in FIG. 7B the obtained image 780 comprising the reflected light pattern of dots and the skeleton superposed on the image of the passenger seating at the vehicle front or back seats are analyzed to estimate the length of the person body parts, e.g. shoulders, hips, torso, legs, body etc.

At step 760 the one or more skeleton models of each occupant are analyzed to filter out (e.g. removed or deleted), one or more skeleton models, based on for example predefined filtering criteria, and yield valid skeleton models (e.g. suitable for mass estimation) of the occupants, in accordance with embodiments. The predefined filtering criteria include selection rules which define a required pose and orientation for estimating the occupant's mass. For example, the predefined filtering criteria include selection rules which define 'abnormal' or 'non-valid' pose or orientation of the occupants. An 'abnormal' pose or orientation may be defined as an occupant's pose or orientation where a full or almost full skeleton representation is not presented or imaged due for example of nonstandard sitting position of the occupant or as a result of imaging the occupant in an angle in respect to the image sensor where the occupant may not be completely seen. In some cases, the nonstandard pose may relate to a pose where the occupant is not sitting straight, for example in a bending position. Accordingly, the analysis of these 'abnormal' skeleton representations is used to discard poses defined as 'abnormal' (e.g. inaccurate or false measurement) and therefore these skeletons are omitted from the mass estimation process. Nonlimiting examples of filtering criteria include defined spatial relation between skeleton features of the identified objects and/or identified abnormal poses. Nonlimiting examples of discarded poses are illustrated in FIGS. 5A and 5B.

In some cases, the analyzed images may be filtered using a pose density model method. In accordance with embodiments, the pose density model method includes placing each of the object's skeleton configuration in a high-dimensional space and discarding any configurations which are within a predetermined distance from a high-density area in this space.

At step 770 the valid skeleton models of the occupants are analyzed to estimate the mass of the occupants, in accordance with embodiments. In some embodiments, the analysis process includes inserting the extracted fearers of the valid skeleton models to measurement model such as a pre-trained regression model configured to estimate the mass in time (t) of the occupants based on current and previous (t−i) mass measurements. In some cases, the estimation model is a machine learning estimation model configured to determine the mass and/or mass classification of the occupants. In some cases, the measurement model is configured to provide a continuous value of a predicted mass, or perform a coarser estimation and classify the occupant according to mass class (e.g. child, small adult, normal, big adult).

Alternately or in combination the valid skeleton models of the occupants are processed to classify each occupant according to a predetermined mass classification. For example, a passenger weighing around 60 kg, e.g. 50-65 kg will be classified in a "small adult" subclass, while a child weighing around 25 kg, e.g. in the range of 10-30 kg will be classified as "child" sub-lass.

FIG. 7C is a schematic flowchart of method 705 for estimating the mass of one or more occupants in a vehicle, in accordance with embodiments. Method 705 present all steps of the aforementioned method 700 but further includes at step 781 classifying the identified occupants in accordance with one or more measured mass sub-categories (e.g. child, small adult, normal, big adult).

At step 782 an output, such as output signal, is generated based on the measured and determined mass or mass classification of each identified occupant. For example, the output signal including the estimated mass and/or mass classification may be transmitted to an airbag control unit (ACU) to determine whether airbags should be suppressed or deployed, and if so, at various output levels.

According to other embodiments, the output including the mass estimation may control the vehicle's HVAC (Heating, Ventilating, and Air Conditioning) systems; and/or optimize vehicle's electronic stabilization control (ESC) according to each of the vehicles occupants measured mass.

Figure 8:
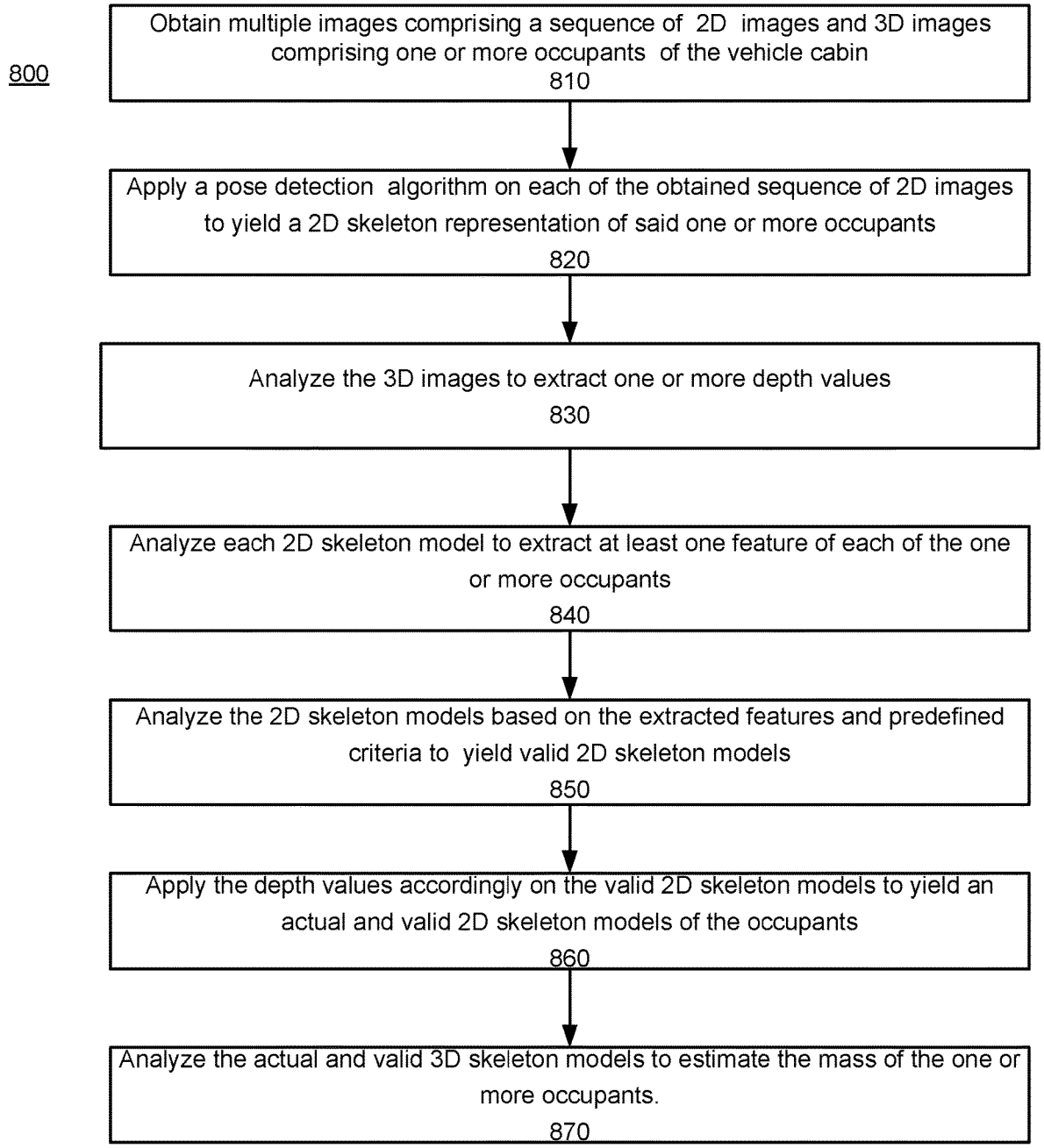
FIG. 8 is a schematic flowchart of the method for measuring the mass of one or more occupants in a vehicle, in accordance with other embodiments of the present disclosure.

FIG. 8 is a schematic flowchart of method 800 for measuring the mass of one or more occupants in a vehicle, in accordance with another embodiment. For example, the method may include determining the mass of one or more occupants sitting on a vehicle seats, for example in real time, according to one or more mass classification categories and accordingly output one or more singles to activate one or more of the vehicles units. Some stages of method 800 may be carried out at least partially by at least one computer processor, e.g., by processor 152 and/or vehicle computing unit. Respective computer program products may be provided, which comprise a computer readable storage medium having computer readable program embodied therewith and configured to carry out of the relevant stages of method 800. In other embodiments, the method includes different or additional steps than those described in conjunction with FIG. 8. Additionally, in various embodiments, steps of the method may be performed in different orders than the order described in conjunction with FIG. 8.

At step 810 multiple images including one or more visual images, for example, a sequence of 2D images, and a sequence of 3D images of the vehicle cabin are obtained, in accordance with embodiments. The obtained sequence of 2D and 3D images include images of one or more occupants such as a driver and/or passenger(s) seating in the vehicle rear and/or back seats. In accordance with embodiments, the 3D images may be any type of stereoscopic images such as images captured by a stereoscopic camera. Alternatively or in combination, the 3D images may be captured by a ToF image sensor. Alternatively or in combination, the 3D images may include reflected light patterns. The 2D images may be clean visual images which for example do not include reflected light patterns. In some embodiments, the multiple images (e.g. 2D and 3D images) are captured synchronically and/or sequentially by an image sensor located in the vehicle cabin, for example at the front section of the vehicle as illustrated in FIG. 1A.

The 3D images may include depth map representations of the occupants, in accordance with embodiments. For example, the captured 3D images of the object illuminated with the structured light may include specific pattern features that correspond to the illumination patterns projected onto the object. The pattern features can be stripes, lines, dots or other geometric shapes, and includes uniform or non-uniform characteristics such as shape, size, and intensity. An example captured image illuminated with specific structured light (e.g. dots) is described in FIG. 3A. In other embodiments, different type of 3D images may be used to extract the depth maps.

In some cases, the images are obtained and processed in real-time. In some cases, the 2D images and 3D images may be captured by a single image sensor. In some cases, the 2D images and 3D images may be captured by different image sensors.

At step 820 one or more detection algorithms such as pose detections and/or posture detection algorithms are applied on the obtained sequence of 2D images to detect the pose and orientation of the occupants in the vehicle cabin. Specifically, the pose detection algorithms are configured to generate a skeleton representation (e.g. 2D skeleton representation) or 2D skeleton models for each occupant to identify and/or measure features such as position; orientation; body parts; length and width of the occupants. For example, the position and orientation of the object may be detected and measured by applying an OpenPose algorithm on the images. Specifically, in accordance with embodiments, a Neural Network such as a DNN (Deep Neural Network) is applied for each obtain 2D image over time (t) to generate (e.g. superpose) a skeleton layer (e.g. 2D skeleton representation) on each identified occupant. The skeleton layer may comprise multiple key-points locations which describe the occupant's joints. In other words, the key-points represent body landmarks (e.g. joint body points) which are detected at the captured body image forming the skeleton representation as shown in FIGS. 4A and 4B. In accordance with embodiments, each key-point of the skeleton representation includes an identified coordinate (x, y) at the occupant(s) body image to be used for extracting features of the identified occupants.

In some embodiments, the pose estimation methods may be further used to identify the occupants and/or occupant's seat in each of the obtained 2D images.

In some embodiments, the pose estimation methods are configured to extract one or more features of the occupants and/or the occupant's surroundings such as the occupant's body parts and the locations of the occupant's seat.

In some embodiments, the identified occupants are separated from one another to yield a separate image for each identified occupant. In some embodiments, each separated image includes the identified occupant and optionally the occupant surroundings such as the occupant's seat.

In some embodiments, each obtained 2D image of the sequence of 2D images is divided based on the number of identified occupants in the image so a separated skeleton is generated for each identified occupant.

In some embodiments, a confidence grade is assigned to each estimated key-point is space (e.g. vehicle cabin).

At step 830, the 3D images (e.g. depth maps) are analyzed to extract one or more distance or depth values relating to the distance of the scene or objects in the scene (e.g. occupants) or the vehicle's seats from a reference point such as an image sensor, in accordance with embodiments. The extraction of these depth values is required as objects in a captured 2D image located away from one another mistakenly look as having the same size. Therefore, to measure the actual size of the occupants in the vehicle the one or more extracted depth values may be used as a reference scale such as a scale factor or normalization factor to adjust the absolute values of the skeleton model. In some cases, the one or more distance values may be extracted by measuring the average depth value of the occupant's features (e.g. skeleton values such as hips, width, shoulders torso and/or other body organs), for example in pixels. In some cases, a single scale factor is extracted. In some cases, a scale factor is extracted for each occupant and/or for each obtained image.

At step 840 the 2D skeleton models are analyzed to extract one or more features of the occupants. In an embodiment, the extracted features may include data such as measured pose and/or orientation of each occupant in the vehicle. In some embodiments, the features may further include the length of one or more body organs of the occupants, such as major body parts of the occupant, e.g., shoulders, hips, torso, legs, body, etc.

At step 850 the one or more 2D skeleton models of each occupant are analyzed to filter out (e.g. remove or delete), one or more 2D skeleton models, based on for example the extracted one or more features and predefined filtering criteria to yield valid 2D skeleton models (e.g. suitable for weight estimation) of the occupants, in accordance with embodiments. The predefined filtering criteria include selection rules which define a required pose and orientation for estimating the occupant's mass. For example, the predefined filtering criteria include selection rules which define 'abnormal' pose or orientation of the occupants. An 'abnormal' pose or orientation may defined as an occupant's pose or orientation where a full or almost full skeleton representation is not presented or imaged due for example of nonstandard sitting position of the occupant or as a result of imaging the occupant in an angle in respect to the image sensor where the occupant may not be completely seen. In some cases, the nonstandard pose may relate to a pose where the occupant is not sitting straight, for example in a bending position. Accordingly, the analysis of these 'abnormal' skeleton model representations is used to discard poses defined as 'abnormal' (e.g. inaccurate or false measurement) and therefore these skeletons are deleted. Non limiting examples of filtering criteria include defined spatial relation between skeleton features of the identified objects and/or identified abnormal poses. Non limiting examples of discarded poses are illustrated in FIGS. 5A and 5B.

In some cases, the analyzed images may be filtered using a pose density model method. In accordance with embodiments, the pose density model method includes placing each of the object's skeleton configuration in a high-dimensional space and discarding any configurations which are within a pre-determined distance from a high-density area in this space.

At step 860 the measured scale factor, for example for each occupant or for each image, is applied accordingly on the valid 2D skeleton models of the related occupants to yield scaled 2D skeleton model of the occupants (e.g. correctly scaled 2D skeleton model of the occupants). The scaled 2D skeleton models of the occupants include information relating to the distance of the skeleton model from a viewpoint (e.g. image sensor).

At step 870 the scaled skeleton models of the occupants are analyzed to estimate the mass of the occupants, in accordance with embodiments. In some embodiments, the analysis process includes inserting the extracted fearers of the scaled 2D skeleton models to a measurement model such as a pre-trained regression model configured to estimate the mass of the occupants. In some cases, the measurement model is a machine learning estimation model configured to determine the mass and/or mass classification of the occupants. In some cases, the measurement model is configured to provide a continuous value of a predicted mass, or perform a coarser estimation and classify the occupant according to mass class (e.g. child, small adult, normal, big adult).

Alternately or in combination the valid skeleton model of the occupants are processed to classify each occupant according to a predetermined mass classification. For example, a passenger weighing around 60 kg, e.g. 50-65 kg will be classified in a "small adult" subclass, while a child weighing around 25 kg, e.g. in the range of 10-30 kg will be classified as "child" sub-lass.

Figure 9B:
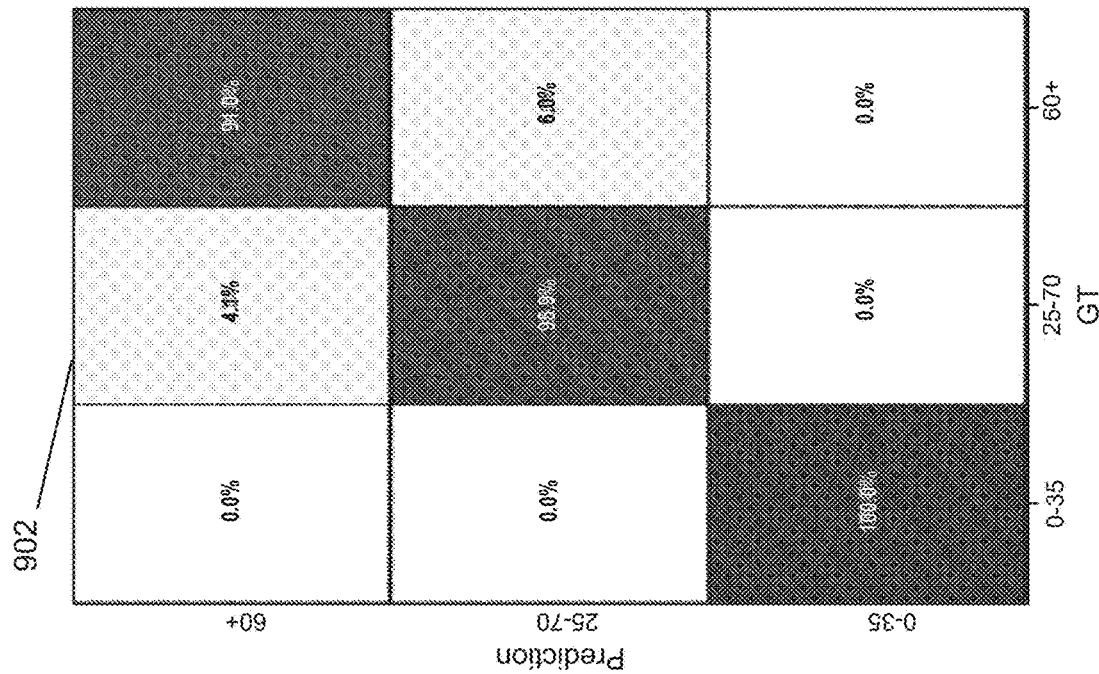
FIGS. 9A-9C show graphs of massing prediction results of one or more occupants seating in a vehicle cabin, in accordance with embodiments.
Figure 9A:
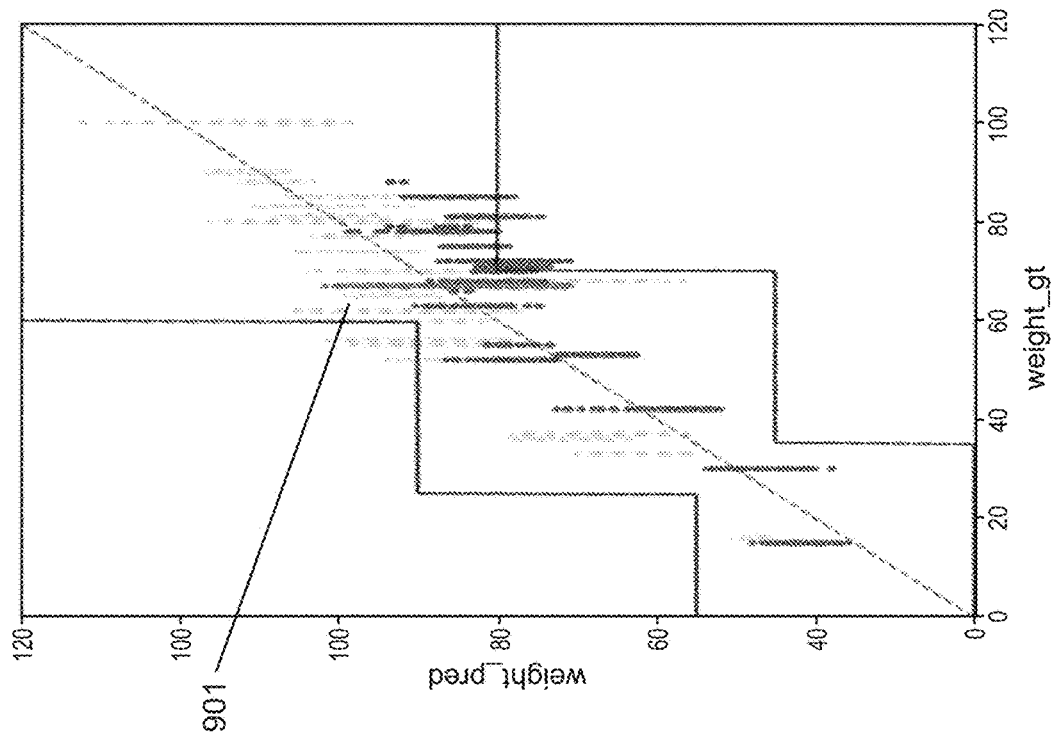

FIG. 9A shows a graph 901 of massing prediction results (Y axis) of one or more occupants in a vehicle cabin as a function of the real measured mass (X axis) of these occupants, based on the analysis of captured images over time and filtering out non-valid images of the occupants in the vehicle, in accordance with embodiments. Specifically, each captured image is analyzed and a massing prediction is generated for the identified valid images while non-valid images are discarded. In an embodiment, each point of the graph 901 represents a frame captured and analyzed in accordance with embodiments. As can be clearly illustrated from the graphs the predicted mass of the occupants is in the range of the real measured mass of the occupants. For example, the predicted mass of occupants massing 100 Kg is predicted accordingly based on the present method and system to be in the range of 80-120 kg (and the average is around 100 kg).

FIG. 9B shows a massing prediction percentage presentation 902 of massing classifications, in accordance with embodiments. For example, the massing prediction of mass classification of 0-35 kg is 100%, 25-70 is 95.9% and 60+ is 94%.

Figure 9C:
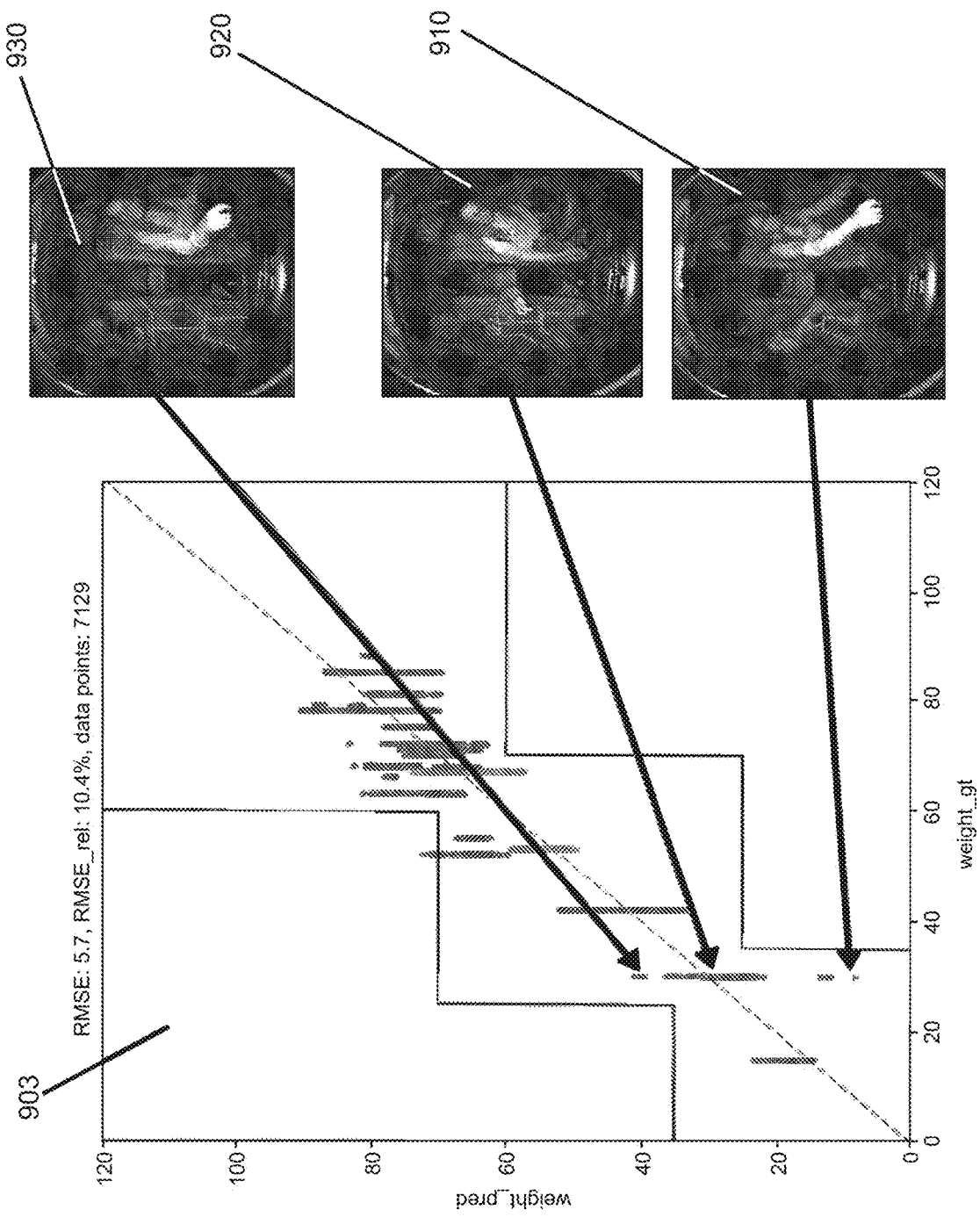

FIG. 9C shows another example of graph 903 of massing prediction results (Y axis) of one or more occupants seating in a vehicle cabin as a function of the real measured mass (X axis) of these occupants, based on the analysis of captured images such as images 910, 920 and 930 of the occupants in the vehicle, in accordance with embodiments. As shown in FIG. 9C, in some cases some non-valid images such as image 910 are not filtered out and accordingly they affect the accuracy of the massing prediction. Usually, non-valid images such as 2D image 910 will be automatically filtered out, for example in real-time, to analyze images including only standard position (e.g. valid images) of the occupants and accordingly to obtain an accurate massing prediction.

In some cases, the identification of the non-standard position of an occupant such as the position shown in image 910 may be used to activate or deactivate one or more of the vehicle units, such as airbags. For example, the identification of an occupant bending or moving his head away from the road based on the pose estimation model as described herein may be reported to the vehicle's computer and/or processor and accordingly, the vehicle airbag or hazard alerts devices may be activated.

It is understood that embodiments of the present invention may include mass estimation and/or mass determination of occupants in a vehicle. For example, systems and methods can provide a fast and accurate estimation of the occupants.

In further embodiments, the processing unit may be a digital processing device including one or more hardware central processing units (CPU) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, an OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the system disclosed herein includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device.

In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media. In some embodiments, the system disclosed herein includes at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof. In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the system disclosed herein includes one or more databases, or use of the same. In view of the disclosure provided herein, those of skill in the art will recognize that many databases are suitable for storage and retrieval of information as described herein. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for estimating mass of one or more occupants in a vehicle cabin, said method comprising:
providing a processor configured to:
obtain multiple images of said one or more occupants, wherein the multiple images comprising a sequence of two-dimensional (2D) images and three-dimensional (3D) images of said vehicle cabin captured by an image sensor;
apply a pose detection algorithm on each of the obtained sequences of the 2D images to yield one or more skeleton representations of said one or more occupants;
combine one or more of the 3D images of the sequence of the 3D images with the one or more skeleton representations of said one or more occupants to yield at least one skeleton model for each one of said one or more occupants wherein the at least one skeleton model comprises information relating to a distance of one or more key-points of the at least one skeleton model from a viewpoint;
analyze the at least one skeleton model to extract one or more features of each of said one or more occupants; and
process the one or more extracted features of the at least one skeleton model to estimate said mass of each said one or more occupants.

2. The method of claim 1, wherein the processor is configured and enabled to filter out the at least one skeleton model based on predefined filtering criteria to yield valid skeleton models.

3. The method of claim 2, wherein the predefined filtering criteria includes specific selection rules which define valid poses or orientations of said one or more occupants.

4. The method of claim 2, wherein the predefined filtering criteria is based on one of:
a high density model; and
measured confidence grades of one or more key-points in the skeleton representations from the 2D images, wherein the confidence grades are based on a measured probability heat map of the one or more key-points.

5. The method of claim 1 wherein the processor is configured to generate one or more output signals comprising said estimated mass of each one of said one or more occupants, wherein the output signals are associated with an operation of one or more units of said vehicle cabin, and wherein the units of said vehicle cabin are selected from the group consisting of an airbag, an Electronic Stabilization Control (ESC) Unit, and a safety belt.

6. The method of claim 1, wherein the sequence of 2D images are visual images of said vehicle cabin.

7. The method of claim 1, wherein the sequence of 3D images are one or more of reflected light pattern images and stereoscopic images.

8. The method of claim 1, wherein the image sensor is selected from a group consisting of Time of Flight (ToF) camera and a stereoscopic camera.

9. The method of claim 1, wherein the pose detection algorithm is configured to identify a pose or orientation of said one or more occupants in the obtained 2D images.

10. The method of claim 1, wherein the pose detection algorithm is configured to:
identify multiple key-points of one or more occupant body portions in at least one 2D image of the sequence of 2D images; and
link pairs of the detected multiple key points to generate the one or more skeleton representations of said one or more occupant in the 2D images, wherein the multiple key points are joints of a body of said one or more occupant.

11. The method of claim 1, wherein the one or more extracted features are features of said one or more occupants including said one or more occupant's shoulder length, torso length, knee length, pelvis location, and hip width.

12. A system for estimating mass of one or more occupants in a vehicle cabin, said system comprising:
a sensing device comprising:
an illumination module comprising one or more illumination sources configured to illuminate said vehicle cabin;
at least one imaging sensor configured to capture a sequence of two-dimensional (2D) images and three-dimensional (3D) images of said vehicle cabin; and
at least one processor configured to:
apply a pose detection algorithm on each of the captured sequences of 2D images to yield one or more skeleton representations of said one or more occupants;
combine one or more of the 3D images of the sequence of 3D images with the one or more skeleton representations of said one or more occupants to yield at least one skeleton model for each one or more occupants, wherein the at least one skeleton model comprises information relating to a distance of one or more key-points in the at least one skeleton model from a viewpoint;
analyze the at least one skeleton model to extract one or more features of each of the one or more occupants; and
process the one or more extracted features of the at least one skeleton model to estimate said mass of each of said one or more occupants.

13. The system of claim 12, wherein the processor is configured to filter out the at least one skeleton model based on predefined filtering criteria to yield valid skeleton models.

14. The system of claim 13, wherein the predefined filtering criteria includes specific selection rules which define valid poses or orientations of said one or more occupants.

15. The system of claim 13, wherein the predefined filtering criteria is based on measured confidence grades of one or more key points in the one or more skeleton representations, wherein the measured confidence grades are based on a measured probability heat map of the one or more key points.

16. The system of claim 13, wherein the predefined filtering criteria is based on a high-density model.

17. The system of claim 12, wherein the sensing device is selected from a group consisting of a Time of Flight (ToF) sensing device and a stereoscopic sensing device.

18. The system of claim 12, wherein the sensing device is a structured light pattern sensing device and the one or more illumination sources is configured to project modulated light in a predefined structured light pattern on said vehicle cabin, wherein the predefined structured light pattern is constructed of a plurality of diffused light elements, and wherein a shape of the diffused light elements is one or more of a dot, a line, a stripe, or a combination thereof.

19. The system of claim 12, wherein the processor is configured to generate one or more output signals comprising said estimated mass or body mass classification of each of said one or more occupants, wherein the output signals correspond to an operation of one or more units of said vehicle cabin, and wherein the units of said vehicle cabin are selected from a group consisting of an airbag, an Electronic Stabilization Control (ESC) Unit, and a safety belt.

* * * * *